(12) United States Patent
Louis et al.

(10) Patent No.: US 10,721,514 B2
(45) Date of Patent: Jul. 21, 2020

(54) CUSTOMIZING A VIDEO TRAILER BASED ON USER-SELECTED CHARACTERISTICS

(71) Applicant: Facebook, Inc., Menlo Park, CA (US)

(72) Inventors: Jennifer Jordan Louis, Playa Vista, CA (US); Scott Drey, Shoreline, WA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/855,018

(22) Filed: Dec. 27, 2017

(65) Prior Publication Data

US 2019/0200064 A1    Jun. 27, 2019

(51) Int. Cl.
| | |
|---|---|
| *H04N 7/173* | (2011.01) |
| *H04N 21/2668* | (2011.01) |
| *H04N 21/8549* | (2011.01) |
| *H04N 21/239* | (2011.01) |
| *H04N 21/475* | (2011.01) |
| *H04N 21/4788* | (2011.01) |
| *H04N 21/25* | (2011.01) |
| *H04N 21/258* | (2011.01) |
| *G06F 16/951* | (2019.01) |
| *G06F 16/78* | (2019.01) |
| *G06F 40/289* | (2020.01) |

(Continued)

(52) U.S. Cl.
CPC ......... *H04N 21/2668* (2013.01); *G06F 16/78* (2019.01); *G06F 16/951* (2019.01); *G06F 40/289* (2020.01); *H04N 21/2393* (2013.01); *H04N 21/251* (2013.01); *H04N 21/25891* (2013.01); *H04N 21/4755* (2013.01); *H04N 21/4788* (2013.01); *H04N 21/8549* (2013.01); *G06Q 30/0269* (2013.01); *G06Q 30/0277* (2013.01); *G06Q 50/01* (2013.01); *H04L 63/10* (2013.01)

(58) Field of Classification Search
CPC .......... H04N 7/17318; H04N 7/17336; H04N 21/47202; H04N 21/812; H04N 21/6125; H04N 21/6587; H04N 21/235; H04N 21/435
See application file for complete search history.

(56) References Cited

U.S. PATENT DOCUMENTS 5,821,945 A * 10/1998 Yeo ........................ G06F 16/745
345/440
9,762,971 B1 * 9/2017 Dodge ............... H04N 21/4826
(Continued)

*Primary Examiner* — Annan Q Shang
(74) *Attorney, Agent, or Firm* — Keller Jolley Preece

(57) ABSTRACT

Methods, systems, and computer readable storage media are disclosed for customizing a video trailer for a media production. In particular, one or more embodiments receive a request for a video trailer for a media production. For example, one or more embodiments receive the request within a messaging thread involving a user and a messaging bot. Additionally, one or more embodiments determine, based on a selection by the user, a first characteristic corresponding to a first characteristic category type associated with the media production and a second characteristic corresponding to a second characteristic category type associated with the media production. One or more embodiments then provide a customized video trailer for the media production that includes content emphasizing the user-selected characteristics.

20 Claims, 10 Drawing Sheets

(51) Int. Cl.
*G06Q 30/02* (2012.01)
*H04L 29/06* (2006.01)
*G06Q 50/00* (2012.01)

(56) References Cited

U.S. PATENT DOCUMENTS

| | | | |
|---|---|---|---|
| 9,800,828 B1* | 10/2017 | Rothschild | H04N 19/00472 |
| 2002/0029384 A1* | 3/2002 | Griggs | H04N 7/17318 |
| | | | 725/46 |
| 2003/0088646 A1* | 5/2003 | Yeo | H04N 7/17318 |
| | | | 709/219 |
| 2007/0268874 A1* | 11/2007 | Vare | H04H 60/37 |
| | | | 370/338 |
| 2009/0049490 A1* | 2/2009 | White | H04N 7/17318 |
| | | | 725/100 |
| 2009/0292587 A1* | 11/2009 | Fitzgerald | G06Q 30/02 |
| | | | 705/7.29 |
| 2011/0107374 A1* | 5/2011 | Roberts | H04N 5/44543 |
| | | | 725/46 |
| 2012/0036524 A1* | 2/2012 | Mugulavalli | H04N 21/258 |
| | | | 725/9 |
| 2012/0054797 A1* | 3/2012 | Skog | H04N 21/42224 |
| | | | 725/41 |
| 2012/0304050 A1* | 11/2012 | Tiu, Jr. | G06F 17/2247 |
| | | | 715/234 |
| 2013/0347044 A1* | 12/2013 | Lee | H04N 21/2387 |
| | | | 725/88 |
| 2014/0164507 A1* | 6/2014 | Tesch | H04L 51/10 |
| | | | 709/204 |
| 2014/0188992 A1* | 7/2014 | Jayawardane | H04L 65/403 |
| | | | 709/204 |
| 2015/0067514 A1* | 3/2015 | Lewis | G11B 27/031 |
| | | | 715/720 |
| 2015/0332341 A1* | 11/2015 | Gadoury | G06Q 30/0251 |
| | | | 705/14.66 |
| 2015/0341682 A1* | 11/2015 | McDonough | H04N 21/2365 |
| | | | 725/25 |
| 2015/0375117 A1* | 12/2015 | Thompson | A63F 13/35 |
| | | | 463/9 |
| 2016/0014471 A1* | 1/2016 | Dadheech | H04N 21/6338 |
| | | | 725/116 |
| 2016/0249116 A1* | 8/2016 | Harb | H04N 21/4667 |
| 2017/0109037 A1* | 4/2017 | Seo | G06F 3/04883 |
| 2018/0060946 A1* | 3/2018 | Devries | G06Q 30/0643 |
| 2018/0124438 A1* | 5/2018 | Barnett | H04N 21/23424 |
| 2018/0314976 A1* | 11/2018 | Miao | H04L 67/306 |
| 2019/0037283 A1* | 1/2019 | Krauss | H04N 21/8106 |
| 2019/0089816 A1* | 3/2019 | Slovacek | G06F 9/453 |

* cited by examiner

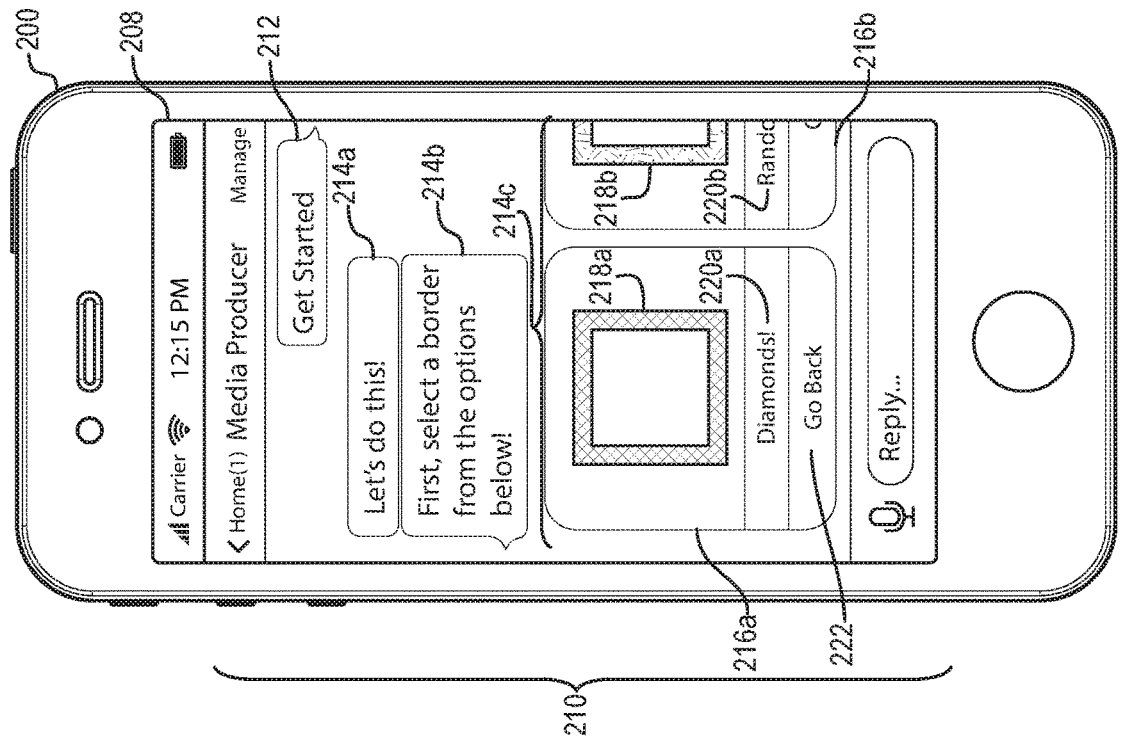
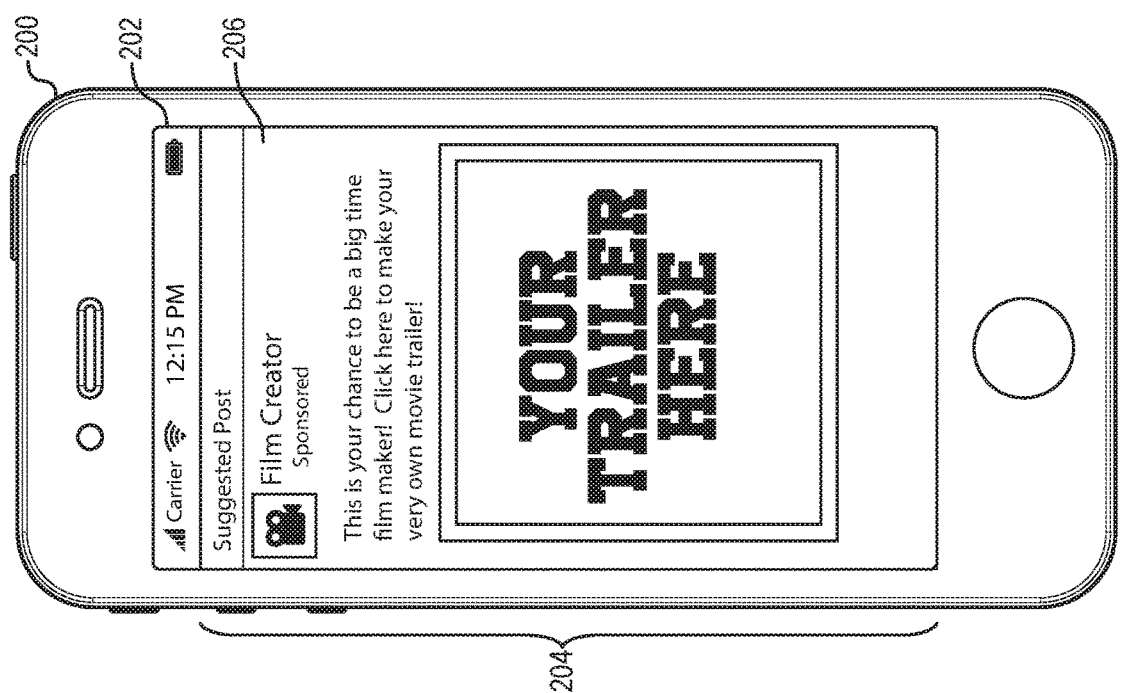
*FIG. 2B*
*FIG. 2A*

CUSTOMIZING A VIDEO TRAILER BASED ON USER-SELECTED CHARACTERISTICS

BACKGROUND AND RELEVANT ART

Many media production studios create video trailers for movies, television programs, or other media productions in advance of release dates of the media productions. For example, media production studios typically release video trailers for movie productions weeks or months prior to the release dates, and sometimes release video trailers up to a year or more in advance of the release dates of large budget movie productions. Additionally, the video trailers often include video clips, dialogue, and/or music from the media production, along with narration, text, or visual overlays highlighting content of the media production. By releasing video trailers that highlight content of the media productions, media production studios attempt to generate discussion and excitement for the media productions and, ultimately, to maximize ticket revenue or advertisement revenue associated with the media production.

While media production studios create video trailers to generate discussion and excitement for the media productions, the media production studios conventionally generate a limited number of generic video trailers that are generally distributed across various mass media platforms. Specifically, media production studios frequently distribute trailers for presentation with similar movies (e.g., prior to presentation of the movies), during commercial/advertising breaks of live television streams, or via other media that reaches a large audience.

While conventional methods of creating trailers for movies and other media productions allow for widespread exposure of the trailers to audiences and viewers that may be interested in the corresponding media productions, such methods lack versatility. Thus, conventional methods of creating and presenting trailers may fail to create a personal connection between the viewers and the media productions. Without such a personal connection, trailers may fail to generate the intended discussion and excitement for the media productions.

Accordingly, there are a number of considerations to be made in providing video trailers.

SUMMARY

One or more embodiments provide benefits and/or solve one or more of the foregoing or other problems in the art with systems, methods, and computer readable storage media for providing customized video trailers for a media production based on user-selected characteristics. In particular, the systems, methods, and computer readable storage media provide a plurality of characteristic category types associated with the media production. The disclosed systems, methods, and computer readable storage media determine, for a user, a characteristic for each of the characteristic category types. The systems, methods, and computer readable storage media then provide, to the user, a customized video trailer for the media production that includes content emphasizing the characteristics determined for the user.

Furthermore, the disclosed systems, methods, and computer readable storage media can be implemented within a messaging environment using a messaging bot. Specifically, a user can communicate with the messaging bot to request the customized video trailer. The messaging bot can guide the user through a process to customize a video trailer for a media production by providing messages to the user within a messaging thread. Additionally, the messaging bot can interpret messages from the user to determine the characteristics for the user. Thus, the messaging bot provides a flexible process for users to customize video trailers using natural language.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 2A-2F illustrate user interfaces for customizing a video trailer for a media production in accordance with one or more embodiments;

DETAILED DESCRIPTION

Figure 1:
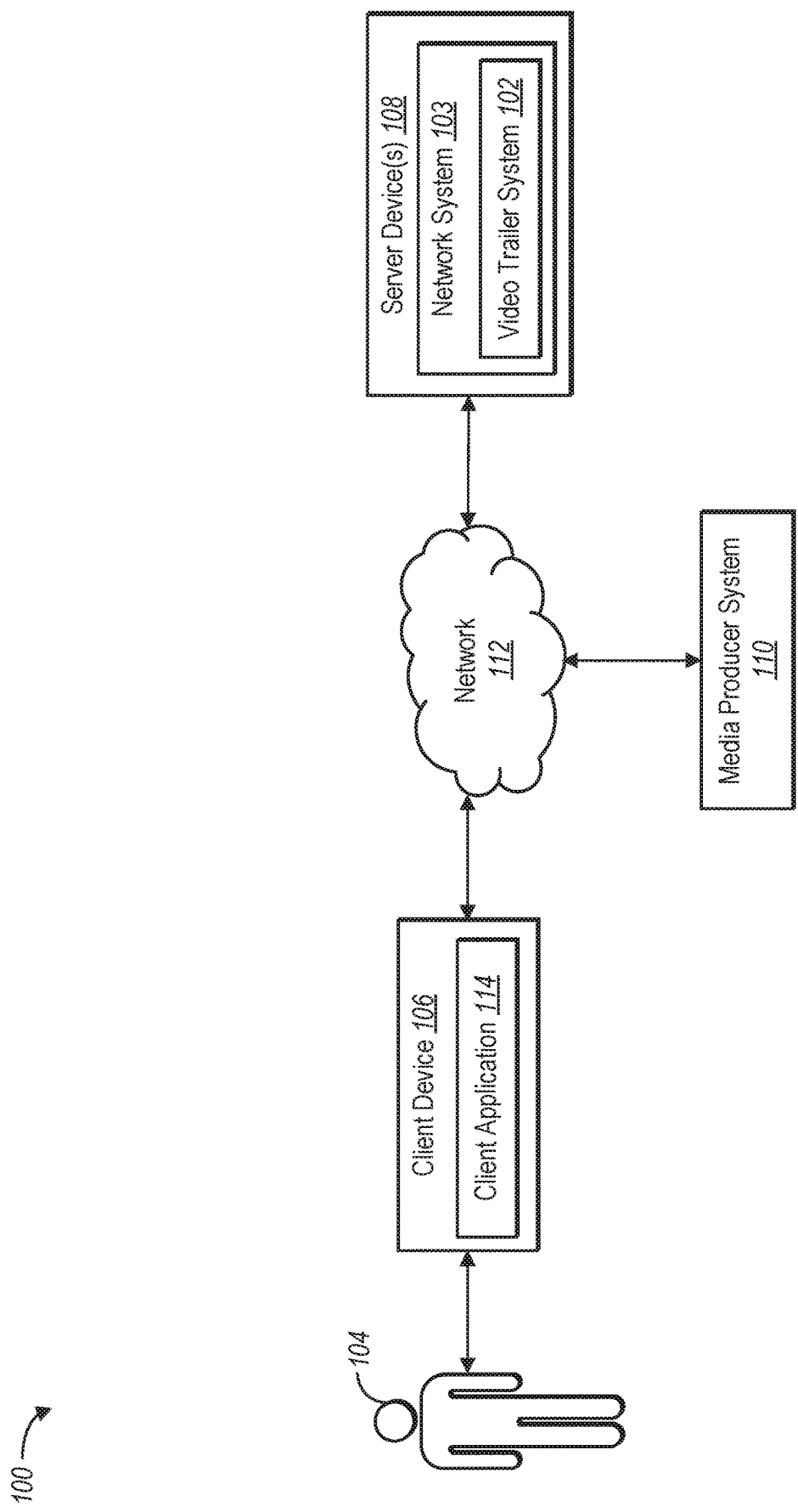
FIG. 1 illustrates a schematic diagram of a video trailer system for customizing video trailers in accordance with one or more embodiments.

One or more embodiments of the present disclosure include a video trailer system that provides customized video trailers to users. Specifically, the video trailer system determines, for a user of a client device, characteristics for a plurality of characteristic category types associated with a media production (e.g., a movie or television program). The video trailer system provides a customized video trailer to the client device that emphasizes the characteristics. For example, the video trailer system can provide characteristics for each of the plurality of characteristics category types from which the user can select characteristics. The video trailer system can then provide a customized video trailer to the client device that features the selected characteristics. Thus, the video trailer system provides video trailers that are personalized to the interests/preferences of users by emphasizing content including the characteristics of the media productions that the users have selected.

In one or more embodiments, the video trailer system provides a customized video trailer to a user (or to a plurality of users) in response to receiving indications of selected characteristics associated with a media production. In particular, the video trailer system receives the indications of selected characteristics for a plurality of characteristic category types associated with the media production. For example, the characteristics can include various visual or audio characteristics selected from a plurality of options available for the corresponding category types. Accordingly, the category types and corresponding characteristics available for each category type depend on the specific media production.

In one or more embodiments, the video trailer system implements the customization of video trailers within a messaging application using a messaging bot. Specifically, the video trailer system can utilize a messaging bot that is capable of communicating with a user requesting a video trailer within a messaging thread. The messaging bot can respond to requests and provide information to the user within the messaging thread using natural language processing. The video trailer system can thus allow a user to customize a video trailer in a flexible messaging environment.

Additionally, in one or more embodiments, the video trailer system provides customized video trailers from a plurality of customized video trailers that a media producer system has generated to emphasize the selected characteristics. For example, the video trailer system can select a customized video trailer from a plurality of video trailers based on the characteristics that the user selected. The media producer system can generate a separate video trailer for each unique combination of characteristics provided to the user. The video trailer system can then provide the customized video trailer to the user based on a mapping between the selected characteristics and the corresponding video trailer from the media producer system.

In one or more alternative embodiments, the video trailer system provides customized video trailers that are generated on-demand in response to the selected characteristics. In particular, the video trailer system can generate the customized video trailers on-demand to include video clips, music, and/or other features corresponding to the selected characteristics. For instance, the video trailer system can access a repository that includes a plurality of available video clips, music, etc., associated with the media production, select content for the video trailer based on the selected characteristics, and then generate the customized video using the selected content.

Additionally, the video trailer system can use information from a social graph of a social networking system for generating and sharing a customized video trailer. Specifically, the video trailer system can access social graph information (e.g., social networking activity) about a user requesting a video trailer to determine interests of the user. The video trailer system can then determine options for selecting characteristics based on the determined interests of the user. Thus, the video trailer system can prioritize options for selecting characteristics in which the user is most likely to be interested when generating the customized video trailer.

Furthermore, the video trailer system can use social graph information to provide recommendations for sharing a customized video trailer and/or for collaborative creation of the customized video trailer. In particular, the video trailer system can use the social graph to analyze the relationships of the user to identify one or more co-users of the social networking system who may be interested in viewing the customized video trailer. The video trailer system can then provide the identified co-user(s) to the user as a recommendation to share the customized video trailer with the identified co-user(s).

By customizing video trailers for a media production based on user-selected characteristics from a plurality of characteristic category types associated with the media production, the video trailer system provides flexibility in distributing video trailers. Indeed, customizing video trailers based on user-selected characteristics allows the video trailer system to provide video trailers that are more likely to engage users. Additionally, customizing video trailers on-demand from a plurality of previously generated clips, music, and/or other content associated with a media production allows the video trailer system to create a wide variety of video trailers using a limited number of content items from each category type.

Furthermore, by customizing video trailers on-demand, the video trailer system provides a large number of unique video trailers with reduced storage requirements. Specifically, by creating the customized video trailers at the time of request rather than creating and storing each unique video trailer beforehand, the video trailer system reduces the overall storage requirements for the customized video trailers. Instead of creating and storing each unique video trailer for users to access at a later date, the video trailer system creates the customized video trailers on-the-fly from a plurality of video clips, music, etc., from a repository of content items. To illustrate, for three separate characteristic categories of three characteristics each (i.e., nine total content items), the video trailer system can generate up to twenty-seven unique customized video trailers. Thus, the video trailer system can provide customized video trailers with reduced storage requirements over conventional systems.

Turning now to the figures, FIG. 1 is a schematic diagram illustrating an environment 100 in which a video trailer system 102 operates for providing customized video trailers of a media production. An overview of the environment 100 will be described next in relation to FIG. 1. Thereafter, a more detailed description of the components and processes of the environment 100 will be described in relation to the remaining figures.

As used herein, the terms "video trailer" and "trailer" refer to a digital preview video for a media production. Specifically, a video trailer can include one or more video/images clips corresponding to a media production. The video clips can include scenes from the media production, video clips describing the media production, and/or video clips otherwise related to the media production. Video trailers can also include audio such as audio from the media production, music, voice-over (e.g., narration), or other audio. Additionally, video trailers can include other content such as images or text as overlays, borders, or full screen images before, between, or after one or more video clips. Also, as used herein, the term "media production" refers to a movie, television program, streaming media program, or other auto/video production.

As used herein, a "customized video trailer" refers to a video trailer that emphasizes characteristics/content selected for a user. For example, a customized video trailer can emphasize user-selected characteristics by including content associated with the user-selected characteristics for a media production. In one or more embodiments, a customized video trailer includes an animated image (e.g., GIF) that includes content emphasizing the user-selected characteristics.

As illustrated by FIG. 1, the environment 100 can include a user 104 associated with a client device 106, server device(s) 108 including the video trailer system 102, and a media producer system 110. The client device 106, server device(s) 108, and media producer system 110 are in communication with each other via a network 112. To provide a customized video trailer to the user 104, the video trailer system 102 can communicate with the media producer system 110 to obtain content to provide to the client device 106 via the network 112. As explained in greater detail below, each component of the system can execute on and/or be implemented by one or more computing devices.

The embodiment illustrated in FIG. 1 includes the user 104 accessing a client application 114 on the client device 106. As explained in greater detail below, the client application 114 can include a software application operating on the client device 106 that allows the user 104 to request a customized video trailer for a media production. For example, the client application 114 can include a messaging application that allows the user 104 to exchange messages with a messaging bot associated with a networking system 103 or other users of the networking application (e.g., other client devices having the client application 114). The messaging bot can analyze messages from the user 104 and reply with messages to the user 104 using natural language processing in connection with providing the customized video trailer in response to the user's request. Alternatively, the client application 114 can include a software application that uses a rigid format for providing customized video trailers to users.

As used herein, the term "messaging bot" refers to an artificial intelligence messaging user. Specifically, a messaging bot includes a messaging user that uses machine-learning and natural language processing to interpret messages from human users and to generate messages to send the human users within a messaging thread. To illustrate, a messaging bot can include an application, script, or program capable of using natural language. Additionally, a messaging bot can interpret messages entered by users using natural language processing to understand each individual message, as well as a context of the communications session as a whole. Furthermore, a messaging bot can provide interpreted information to one or more other components or systems for using the information in customizing a video trailer, as described below.

As used herein, the term "messaging thread" refers to a conversation including electronic messages exchanged between two or more participants within a messaging application. For example, a messaging bot can be implemented within an instant messaging application that allows a user to communicate with the messaging bot using electronic messages. The messaging bot can access information stored at the video trailer system 102 or at third-party systems (e.g., the media producer system 110) for providing information and customized video trailers to users.

The video trailer system 102 communicates with the media producer system 110 to obtain content associated with video trailers. The media producer system can be associated with producing or providing media productions such as, but not limited to, a movie/television studio, movie/television service provider, or a streaming service provider. The media producer system 110 can provide customized video trailers or content for generating customized video trailers to the video trailer system 102. The media producer system 110 can provide the customized video trailers or content in response to a request from the video trailer system 102. Alternatively, the media producer system 110 can provide content to the video trailer system 102 in connection with a release date associated with a given media production. In one or more embodiments, the media producer system 110 is part of the video trailer system 102, such that the video trailer system may produce media content (e.g., streaming video) and also generate and provide customized video trailers for users.

In connection with a request for a customized video trailer, the video trailer system 102 provides a customized video trailer to the client device 106 in response to receiving indications of characteristics. Specifically, the characteristics correspond to a plurality of characteristic category types associated with the media production. As used herein, the terms "characteristic category type" and "category type" refer to related groups of characteristics of a media production. In particular, a media production can include a plurality of different category types such as, but not limited to, scenes, characters, actors, music, colors, fonts, themes, emotions, or other related groups of characteristics.

Additionally, the category types may vary depending on the media production. Also, as used herein, the term "characteristic" refers to a feature or aspect of a media production. For example, a characteristic can include a specific feature or aspect corresponding to a category type. In one or more embodiments, the video trailer system 102 provides a plurality of characteristics for each category type to the client device 106. To illustrate, an actor category type can include actors in the media production.

In one example, the video trailer system 102 provides a first set of characteristics from a first category type and a second set of characteristics from a second category type to the client device 106 (and characteristics from any number of additional category types). The user can then select a characteristic from each of the first set and the second set of characteristics. Based on the selected characteristics, the video trailer system 102 determines a customized video trailer and provides the customized video trailer to the client device 106. In one or more embodiments, the video trailer system 102 obtains a previously generated customized video trailer from the media producer system 110 based on the user-selected characteristics. Alternatively, the video trailer system 102 can obtain content from the media producer system 110 for generating the customized video trailer system on-demand.

Furthermore, the video trailer system 102 can include, or be associated with, a networking system 103, as described in more detail below. The networking system 103 can comprise a system that connects and allows exchange of data over a network. For example, the networking system 103 can comprise a social networking system, a banking system, a search engine, a messaging system, an email system, etc. Also, illustrated in FIG. 1, in one or more embodiments, the networking system 103 operates the video trailer system 102.

In one or more embodiments, client-computing devices, such as client device 106, can include a networking client application 114 associated with the networking system 103. For example, the client application 114 enables the users of the client-computing devices to view and interact with networking system content, and to exchange communications, posts, and other content to other users via the networking system 103. In at least one embodiment, trailers and other content submitted to, or generated by, the networking system 103 can be viewed and interacted with at client-computing devices.

In one or more embodiments, the video trailer system 102 can use information from a social graph associated with the networking system 103 to determine interests of the user 104 for use in providing the customized video trailer to the user 104. The video trailer system 102 can also use information from the social graph to provide recommendations to the user 104 for sharing the customized video trailer with other users of the networking system 103. In one or more embodiments, the networking system 103 also allows a plurality of users to collaboratively customize a video trailer.

Figure 2D:
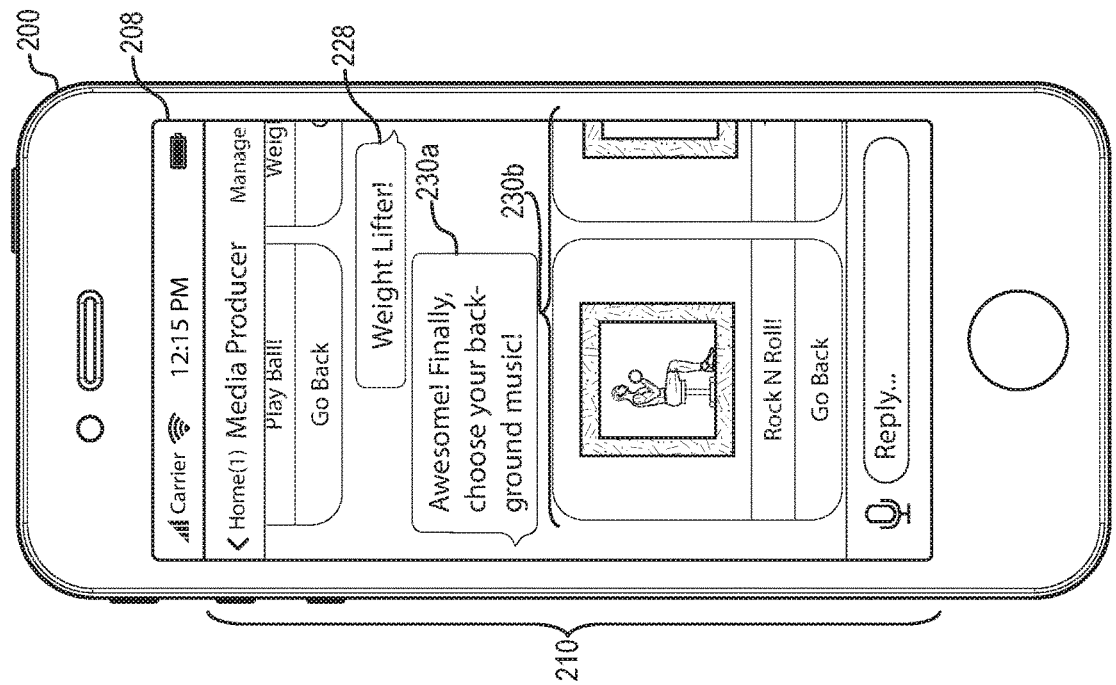

As mentioned above, the video trailer system 102 can provide a number of benefits over conventional systems and methods for distributing video trailers to users. FIGS. 2A-2F illustrate user interfaces of a trailer customization process within a client application that communicates with the video trailer system 102. Specifically, FIG. 2A illustrates a client device 200 that includes a client application for providing an advertisement within a social networking feed in connection with customizing a video trailer. FIGS. 2B-2F illustrate the client device 200 including a client application that allows a user to request a customized video trailer and select a plurality of characteristics in connection with providing the customized video trailer to the user. In one or more embodiments, the client application of FIG. 2A is a separate application from the client application of FIGS. 2B-2F. In alternative embodiments, the client application of FIG. 2A and the client application of FIGS. 2B-2F are the same application.

FIGS. 2A-2F illustrate the client device 200 as a handheld device. As used herein the term "handheld device" refers to a device sized and configured to be held/operated in a single hand of a user. In additional or alternative example, however, any other suitable computing device, such as, but not limited to, a tablet device, a handheld device, larger wireless devices, laptop or desktop computer, a personal-digital assistant device, and/or any other suitable computing device can perform one or more of the processes and/or operations described herein.

FIG. 2A illustrates a view of a graphical user interface provided by a networking application 202 to facilitate sending and receiving of electronic messages (e.g., social network posts). In particular, FIG. 2A illustrates a feed interface 204 for displaying messages sent by and/or sent to a user of a networking system within a message feed. For example, messages displayed within the message feed can include messages composed by the user, messages composed by co-users associated with the user (e.g., friends of the user within the networking system), suggested/recommended messages, advertisements or other messages promoted by businesses or other users within the networking system, or other messages that the networking system determines may be relevant to the user (e.g., based on networking activity of the user and co-users).

As illustrated, the video trailer system 102 provides marketing content to the user within the message feed. Specifically, FIG. 2A illustrates a marketing message 206 within the feed interface 204 related to customizing a video trailer for a media production. The marketing message 206 can include content promoting the media production and indicating that the user can initiate a process to customize a video trailer by selecting the marketing message 206. The marketing message 206 can also include additional media content such as images, video, or audio that draws the user's attention to the marketing message 206 within the message feed.

In one or more embodiments, the video trailer system 102 provides the marketing message 206 in connection with a release date associated with the media production. For example, the video trailer system 102 can communicate with a business entity (e.g., the media producer system 110 of FIG. 1) to determine the release date associated with the media production. Additionally, the video trailer system 102 can provide the marketing message 206 during a specific time period prior to the release date based on a predicted effectiveness of the marketing message 206. To illustrate, allowing users to request customized video trailers for the media production may be most effective for generating discussion and excitement for the media production prior to the release date.

In one or more alternative embodiments, the video trailer system 102 or other entity can provide a marketing message or option to generate a customized video trailer via a website or page associated with the media producer system. For example, the client application can include a web browser, which allows the user to visit a website associated with the media producer system. Alternatively, the client application can include a proprietary application associated with the media producer system or a third-party application.

In one or more embodiments, interacting with the marketing message 206 (e.g., clicking, tapping, or otherwise selecting the marketing message 206) causes the client application 202 to redirect the client device 200 to a messaging environment for the user to interact with a messaging bot. FIGS. 2B-2F illustrate a client application 208 including a messaging interface 210 in which the user can exchange messages with a messaging bot to request a customized video trailer. For example, the user can establish a relationship with the messaging bot (e.g., by adding the messaging bot to the user's contacts) to allow the user to engage in communications with the messaging bot. As previously mentioned, the client application 208 may be the same application as the client application 202 or a different application. For example, in response to the user selecting the marketing message 206 within the feed interface 204, the client application 202 can redirect the client device 200 to the messaging interface 210 within the client application 202. Alternatively, the client application 202 can redirect the client device 200 to a separate application (e.g., a messaging application) including the messaging interface 210.

In one or more embodiments, the client application 208 is a messaging application associated with a networking system that allows the user to interact with one or more co-users of the networking system within messaging threads. Specifically, the messaging threads can include conversations between two or more users of the networking system (e.g., exchanged electronic messages). As described above, the messaging bot can be an artificial intelligence user associated with the networking system that allows users to communicate with the messaging bot in the same way that human users communicate with each other in the messaging application. For instance, the user of the client device 200 can send electronic messages to the messaging bot within the messaging thread. Similarly, the messaging bot can reply to the user within the messaging thread in real-time.

As previously described, the messaging bot can use machine-learning and natural language processing to interpret messages from the user. In at least some embodiments, the messaging bot is trained to understand requests associated with requesting and providing customized video trailers. For instance, the video trailer system 102 (or other system) can train the messaging bot to understand messages related to requesting a customized video trailer for a specific media production. Thus, the video trailer system 102 may train the messaging bot to respond with messages related to customizing a video trailer for the specific media production. Alternatively, the video trailer system 102 may train the messaging bot to interact with users in connection with requesting video trailers for a plurality of different media productions.

As illustrated in FIG. 2B, the messaging interface 210 includes a messaging thread with a plurality of electronic messages. In response to the user selecting the marketing message 206, the client device 200 opens the messaging interface 210 and initiates a messaging thread between the user and the messaging bot. Additionally, in one or more embodiments, selecting the marketing message 206 also causes the client device 200 to automatically generate an initial message 212 (e.g., "Get Started") from the user to the messaging bot requesting to begin the process of customizing a video trailer. Alternatively, the client application 208 can allow the user to manually enter a message requesting to begin the process. The messaging bot may also provide a message or option to the user prompting the user to begin the process by sending a specific response or selecting an option.

In response to the initial message 212 from the user, the video trailer system 102 can begin the process of customizing a video trailer for the user. In particular, the messaging bot can interpret the initial message 212 as a request for a customized video trailer. For example, if the message is an automatically generated message requesting to begin the process of customizing a video trailer, the message may be mapped to an operation to begin the process. Alternatively, the messaging bot can use natural language processing to analyze the initial message 212 and determine that the user has requested to begin the process. In response, the messaging bot can reply with a message 214a (e.g., "Let's do this!") indicating that the video trailer system 102 has initiated the process.

As previously described customizing a video trailer for a media production can involve customizing the video trailer based on a plurality of user-selected characteristics. For example, the video trailer system 102 can determine a plurality of category types from which the user can select characteristics for the customized video trailer. To illustrate, the video trailer system 102 can determine the category types by communicating with the media producer system. Alternatively, the video trailer system 102 can determine the category types by analyzing the available content for customizing a video trailer and grouping related characteristics of the available content into a plurality of category types.

Once the video trailer system 102 has determined the category types for customizing the video trailer for the user, the messaging bot can reply to the user with a message 214b providing instructions to the user for customizing the video trailer. To illustrate, the message 214b of FIG. 2B indicates that the user must select an option from a plurality of options in a first characteristic category type. As illustrated, the first category type includes a border type for placing a border around the video trailer, though the video trailer system 102 may provide the category types to the user in any order (e.g., instead of providing the border type to the user as the first category type, the video trailer system 102 may provide the border type as a second category type, third category type, etc.).

In addition to providing the message 214b indicating instructions, or along with the message 214b indicating instructions, the video trailer system 102 can provide a message 214c indicating a plurality of characteristics associated with the first category type from which the user can select a characteristic for the video trailer. For example, the message 214c can include a plurality of different selectable options from the available characteristics for the first category type. To illustrate, the message 214c can include all of the available characteristics for the first category type. Alternatively, the message 214c can include a subset of available characteristics for the first category type. In yet another example, rather than inserting each of the characteristics into a single message (e.g., message 214c), the messaging bot can send each characteristic as a separate message to be displayed separately.

As briefly mentioned above, the video trailer system 102 can provide a subset of available characteristics for a category type to the user. Specifically, the video trailer system 102 can identify one or more characteristics in which the user may be most likely to select based on social graph information associated with the user in connection with a networking system. For instance, the video trailer system 102 can access a social networking profile of the user to determine one or more interests of the user. Alternatively, the video trailer system 102 can access a social graph that describes relationships between the user and other users or activities performed by the user within the networking system, as described in more detail with reference to FIG. 8 below. To illustrate, the video trailer system 102 can determine that the user is interested in animals based on photos associated with a user profile.

Based on the determined interests of the user, the video trailer system 102 can identify one or more characteristics that are more likely to be of interest to the user. In particular, the video trailer system 102 can determine characteristic(s) associated with the media production that are similar to the determined interests of the user. The video trailer system 102 can also select one or more characteristics based on previously selected characteristics for the user or for other co-users related to the user within the social graph. The video trailer system 102 can then provide the identified characteristic(s) within the message 214c. Additionally, the video trailer system 102 can rank the characteristics (e.g., based on the similarity or other factors) and provide the characteristics in the message 214c in an order based on the ranking.

In one or more embodiments, the message 214c is a dynamic message with which the user can interact. For example, the message 214c can include a scrollable (e.g., horizontally scrollable) list of options. FIG. 2B illustrates the message 214c as a horizontally scrollable list of digital cards (or other message portions) including the selectable characteristics associated with the first category. Specifically, each digital card includes an indicator of a characteristic for the first category. Thus, a first digital card 216a includes a first indicator 218a of a first border, a second digital card 218 includes a second indicator 218b of a second border, etc. Each visual indicator can include a visual representation of the corresponding border, which can include a sample of a pattern to be applied to a border of the customized video trailer when the customized video trailer is finalized.

Furthermore, each element in the message 214c can include a selectable element with which the user can interact to select the corresponding characteristic. For instance, to select the first border in the first digital card 216a, the user can tap or otherwise interact with a first selectable element 220a. Alternatively, to select the second border in the second digital card 216b, the user can tap or otherwise interact with a second selectable element 220b. Similarly, the user can navigate to any element within the list of characteristics and interact with a selectable element to choose the corresponding characteristic for customizing the video trailer. Alternatively, instead of including a separate selectable element, the message 214c may allow the user to interact with the indicator of the characteristic to select the characteristic or any portion of the respective digital card.

Furthermore, each digital card can include a back element 222 that allows the user to return to a previous step in the process of customizing the video trailer. For example, if the user decides to select a different characteristic, the user can select the back element 222 to cause the messaging bot to return to the previous step and send one or more new messages repeating the information for the previous step. Thus, if the user selects the back element 222 in the second step (i.e., a step for selecting a second characteristic), the messaging bot can re-send the message 214b with the instructions and the message 214c with the characteristics for the first category type.

In one or more embodiments, the video trailer system 102 also maps the characteristics to key phrases to be used in the messaging thread. In particular, the key phrases allow the messaging bot to interpret a message containing the key phrase as a selection of a particular characteristic for a category type. For example, as illustrated in FIG. 2B, the first border is associated with a first key phrase ("Diamonds!") that, when entered into the messaging thread, causes the messaging bot to interpret the message as a selection of the first border.

As used herein, the term "key phrase" refers to a combination of characters or icons that the video trailer system can use to identify a characteristic. For example, a key phrase can include letters, numbers, emoji, or other characters that allow the messaging bot to identify the combination of characters or icons separately from other combinations of characters/icons. Furthermore, key phrases can be descriptive of the characteristic (e.g., "Diamonds!" may be descriptive of a pattern associated with the first border, as illustrated in FIG. 2B), randomly generated, or arbitrary words. Accordingly, the video trailer system 102 can map each character in a category type to a specific key phrase to allow the messaging bot to identify the corresponding characteristic in response to detecting the key phrase. In one or more embodiments, key phrases are unique to each characteristic across all category types. In alternative embodiments, key phrases are unique only to characteristics within a single category type, and thus may be repeated across a plurality of category types.

Figure 2C:
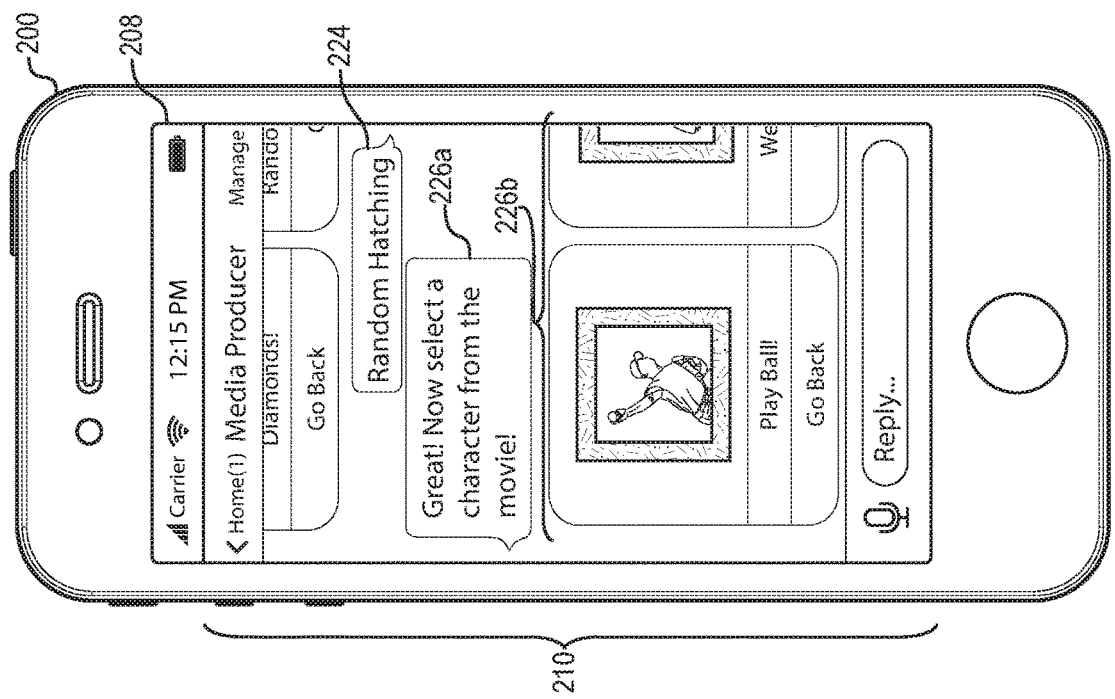

In one or more embodiments, when the user interacts with a selectable element, the client application 208 can automatically input the key phrase corresponding to the selectable element into the messaging thread as a message from the user to the messaging bot. To illustrate, in response to the user selecting the second selectable element 220b corresponding to the second border, the client application 208 can input the corresponding key phrase ("Random Hatching") into the messaging thread as a message 224 from the user to the messaging bot, as illustrated in FIG. 2C. Alternatively, the user may select a characteristic by manually entering the key phrase into the messaging thread instead of interacting with the selectable element.

In response to detecting the key phrase in a message from the user, the video trailer system 102 (e.g., the messaging bot) can determine the corresponding characteristic based on the mapping between the key phrase and the characteristic. For example, the video trailer system 102 can store the mapping between the key phrases and the characteristics in a database (or other electronic storage medium). If the key phrases are unique to the characteristic, the mapping can be a one-to-one mapping between the key phrase and characteristic.

Alternatively, if the key phrases repeat across category types, the mapping can include information about the category type (e.g., a mapping between the key phrase and the characteristic-category type combination). Thus, in response to detecting a key phrase, the video trailer system 102 can perform a lookup within the database to identify the corresponding characteristic for the category type and store the selection of the characteristic for customizing the video trailer.

In one or more alternative embodiments, the video trailer system 102 uses another method for detecting the selection of a characteristic. For example, selecting a characteristic may cause the client application 208 to send a hidden notification to the video trailer system 102 indicating the selected characteristic. The hidden notification may include a key phrase or other identifier associated with the characteristic that allows the video trailer system 102 to determine the selected characteristic.

Once the user has selected a characteristic from the first category type (e.g., the border type of FIG. 2B or other trailer design type), the video trailer system 102 can proceed with the next step of the process of customizing a video trailer. For example, as illustrated FIG. 2C, the video trailer system 102 can provide a message 226a confirming the selection of the characteristic from the first category type, e.g., by updating a dynamic representation of the video trailer within the messaging thread. Additionally, the message 226a can provide instructions for the user to select a characteristic from a second category type. To illustrate, the second category type of FIG. 2C is a content type that includes a plurality of content characteristics associated with the media production that differ from the characteristics of the first category type.

In one or more embodiments, the content type includes content that the video trailer system 102 obtains from the media producer system. For example, the content type can include a plurality of video clips from a movie or television program from which the user can select. Each available option from the content type can include content that distinguishes it from other available options. Accordingly, selecting different content characteristics from the second content type results in different video clips in the final video trailer. The video trailer system 102 provides the content characteristics in a message 226b from the messaging bot to the user within the messaging thread.

To illustrate, a first content characteristic can include content related to a first video clip from the media production. A second content characteristic can include content related to a second video clip from the media production. The first video clip and the second video clip may include different characters, actors, subjects, or themes. Furthermore, the content type can include any number of additional video clips as determined by the video trailer system 102 or the media producer system, each related to a specific video clip with distinguishing content.

As with the first category type, the video trailer system 102 can allow the user to select a characteristic from the second category type by interacting with a digital card including information about the characteristic (e.g., an indicator of the characteristic or a selectable element) or by sending a message including a key phrase (or another identifier) associated with the characteristic. To illustrate, the video trailer system 102 can provide a plurality of characters from the media production as selectable options. Each of the characters can be associated with one or more specific portions of the media production that include the corresponding character. Thus, selecting one of the characters (such as a character who lifts weights within a scene of the media production) indicates to the video trailer system 102 that the user wishes to view a trailer with portion(s) of the media production that include the selected character. FIG. 2D illustrates that the user has sent a message 228 to the messaging bot, the message 228 including a key phrase ("Weight Lifted") corresponding to the second content characteristic of FIG. 2C. The video trailer system 102 can detect the key phrase and perform a lookup in the database to determine the second content characteristic.

FIG. 2D illustrates that, after determining the second content characteristic, the video trailer system then proceeds to a third step for determining a third characteristic for customizing the video trailer. As illustrated, the user selects a third characteristic from a third category type including a music type. Specifically, the video trailer system sends a message 230a indicating that the user has selected a characteristic from the second category type and also including instructions for selecting a characteristic from the third category type.

As briefly mentioned, the third category type in embodiment of FIG. 2D includes a music type, which includes a plurality of available music characteristics from which the user can select. For instance, the music characteristics can be different music genres ("rock and roll," "techno," "slow jams," "party mix," etc.), songs from a soundtrack for the media production, musicians, or other characteristics that may be associated with a music type. In response to determining characteristics for the third category type, the video trailer system 102 provides the characteristics from the third category type in a message 230b from the messaging bot to the user within the messaging thread.

Figure 2F:
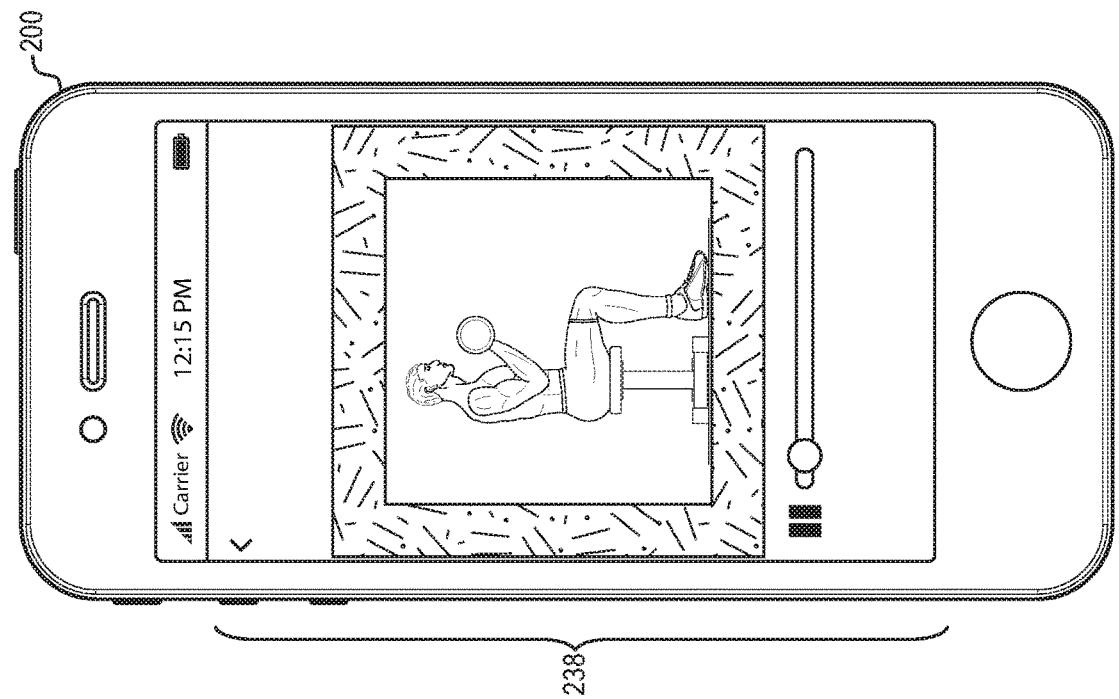
Figure 2E:
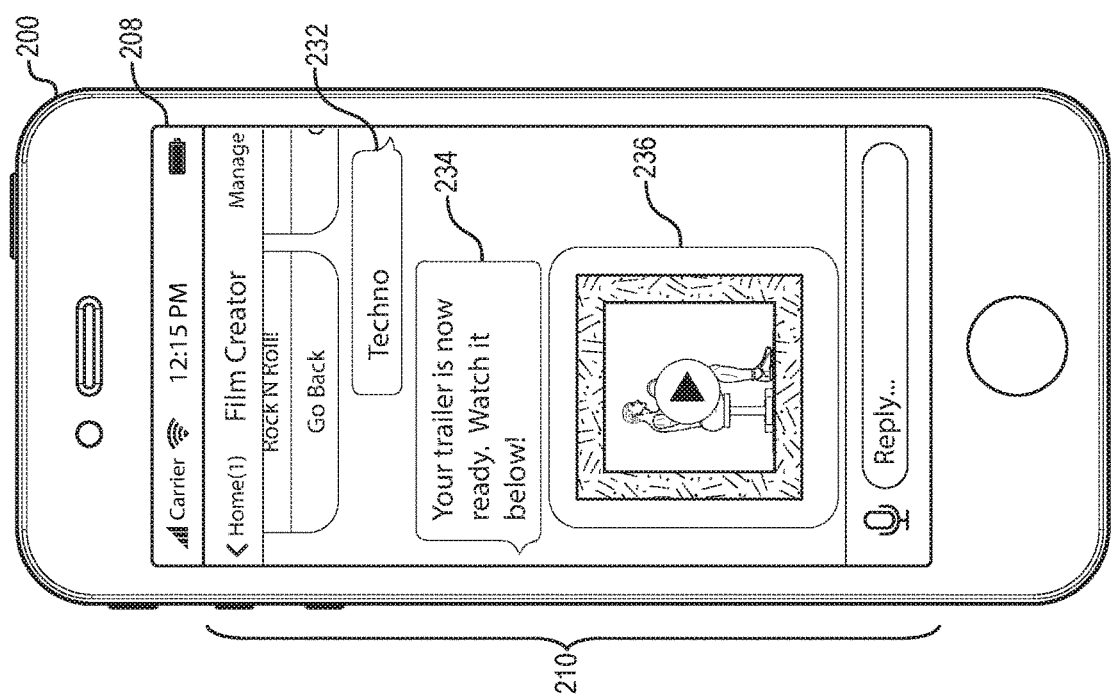

Similar to the first category type and the second category type, the video trailer system 102 determines a characteristic from the third category type based on a message received from the user indicating the selected characteristic. For example, FIG. 2E illustrates a message 232 including a key phrase ("Techno") corresponding to a characteristic from the third category type. After detecting the key phrase from the message 232, the video trailer system 102 can perform a lookup in the database for the corresponding characteristic the key phrase. Additionally, the video trailer system 102 can store the selected characteristic with the other selected characteristics for customizing the video trailer.

In other examples, the video trailer system 102 can provide other selectable options that determine the media content of the trailer. In one or more embodiments, the video trailer system 102 provides a plurality of general themes for determining the type of video content. For example, the video trailer system 102 can allow the user to select a sports theme, an action theme, a drama theme, a love theme, or any other available theme based on the characteristics of the media production. To illustrate, if the user selects a sports theme, the video trailer system 102 can select video content that corresponds to the sports theme.

As mentioned previously, the video trailer system 102 can provide options corresponding to other content characteristics such as colors, fonts, actors, emotions, etc. For each characteristic category type, the video trailer system 102 can determine one or more video or audio clips, images, text, or other content to include in a customized video trailer. Thus, when the user selects a characteristic from a characteristic category type, the video trailer system 102 uses the selected characteristic to identify the corresponding content for including in the trailer.

In the embodiment associated with FIGS. 2A-2F, the process for customizing the video trailer includes three steps for selecting characteristics from three category types. As described previously, the three category types include a border type, a content type, and a music type. While the present embodiment illustrates a specific number of specific category types, the video trailer system 102 can allow a user to customize video trailers with any number of category types, as may serve a particular embodiment. For example, the video trailer system 102 can allow a user to select characteristics from two or more category types.

In at least some implementations, the video trailer system 102 also prompts the user to select multiple characteristics from a single category type. To illustrate, the video trailer system 102 can prompt a user to select two characters from a plurality of possible characters in a media production for including in a customized video trailer. Additionally, the video trailer system 102 can provide the same category type twice, each with a different selection of possible characteristics from the category type. For instance, the video trailer system 102 can provide a content type with a first set of video clips for selecting a first video clip, and then later provide a content type with a second set of video clips for selecting a second video clip.

Once the video trailer system 102 has determined a characteristic for each of the category types, the video trailer system 102 can provide the customized video trailer to the user. In one or more embodiments, the video trailer system 102 sends a message 234 indicating that the video trailer system 102 is ready for the user to view, and then provides the customized video trailer within an additional message 236 within the messaging thread. Alternatively, the video trailer system 102 can first send a message with a status of the video trailer indicating that the customized video trailer is being processed, and then update the status of the video trailer within the message when the customized video trailer is complete.

The user can then view the customized video trailer within the client application 208 or within another application by selecting the customized video trailer within the messaging thread. FIG. 2F illustrates a video interface 238 for playing the customized video trailer received in the messaging thread. In one or more alternative embodiments, selecting the video trailer within the messaging thread plays the video trailer within the messaging thread. In yet another embodiment, selecting the video trailer within the messaging thread redirects the client device 200 to a URL where the trailer is hosted for playing within the client application 208 or within another application (e.g., a web browser).

As briefly described previously, the video trailer system 102 can provide the customized video trailer based on the user-selected characteristics. In one or more embodiments, the video trailer system 102 selects a video trailer that has been customized for the user-selected characteristics from a repository of video trailers. For instance, the media producer system or the video trailer system 102 can generate a plurality of trailers prior to prompting a user to customize a video trailer. The video trailer system 102 selects from a plurality of video trailers including a trailer for each possible combination of characteristics. Selecting from a plurality of previously generated trailers can allow the video trailer system 102 to save time when customizing a video trailer system.

In at least some instances, the video trailer system 102 also applies one or more additional effects to the previously generated trailer. To illustrate, the video trailer system can access a previously generated trailer from a repository associated with the media producer system and then apply one or more user-selected characteristics to the trailer. For example, the video trailer system can apply a selected border, font, color, etc. to the previously generated trailer and then provide the modified trailer to the user.

In one or more alternative embodiments, the video trailer system 102 generates the customized video trailer from a plurality of content items within a repository associated with the media producer system and/or based on licensing agreements with the media producer system or video trailer system 102. In particular, the video trailer system 102 can select video clips from a plurality of available video clips, music from a list of available songs, narrator voice clips, sounds, images, fonts, or other content items to which the media producer system and/or the video trailer system 102 has access. For instance, the video trailer system 102 selects the content items based on the user-selected characteristics and generates a customized video trailer with the selected content items to send to the client device 200. Generating the customized video trailer can include combining video clip(s), music, narration, or other content items into a playable video trailer.

Generating the customized video trailer can also include determining an order in which to combine a plurality of video clips, audio clips, and/or images. For example, the video trailer system 102 can determine an order in which to combine the content items based on a predetermined order (e.g., an order determined by the media producer system) or based on an order in which the user selects the characteristics. In various examples, the video trailer system 102 can generate customized video trailers that follow a different order for the same user-selected characteristics.

Furthermore, the video trailer system 102 can intelligently determine how to combine the content items to create a seamless video trailer. In particular, the video trailer system 102 can use video and/or audio processing to stitch video clips or audio clips together to create smooth transitions. Accordingly, the video trailer system 102 can use pre-edited video/audio clips or edit the video/audio clips on-demand to create the customized video trailer. The video trailer system 102 can also use information provided by a media producer system to determine a contextual order for the content items so that the customized video trailer tells a coherent story associated with the media production. Similarly, the video trailer system 102 can select content items based on information from the media producer system to fit the customized video trailer to a predefined playback time.

As one can appreciate, while FIGS. 2B-2F illustrate an embodiment in which a user exchanges messages with a messaging bot within a messaging thread for requesting and receiving a customized video trailer, the video trailer system 102 can use other methods for providing customized video trailers to users. For example, instead of using a messaging bot to provide customized video trailers the client application 208 can include an interface that provides a more rigid process for requesting a customized video trailer. To illustrate, the video trailer system 102 can implement the process for providing a customized video trailer in a client application that allows a user to select characteristics by selecting buttons or elements from a plurality of lists or menus for the category types. Additionally, the video trailer system 102 may allow the user to select characteristics from category types in a sequence as they are displayed or in any order within a single interface (e.g., in which all category types and characteristics are displayed simultaneously).

Figure 3B:
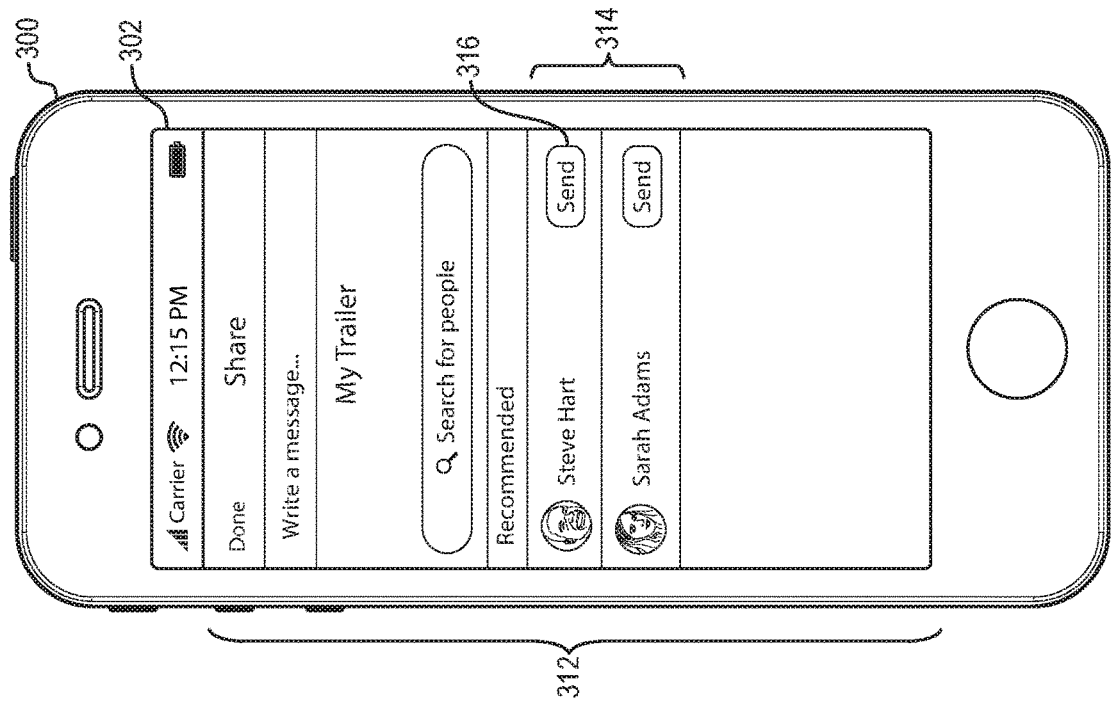
FIG. 3A-3B illustrate user interfaces for sharing a video trailer in accordance with one or more embodiments.
Figure 3A:
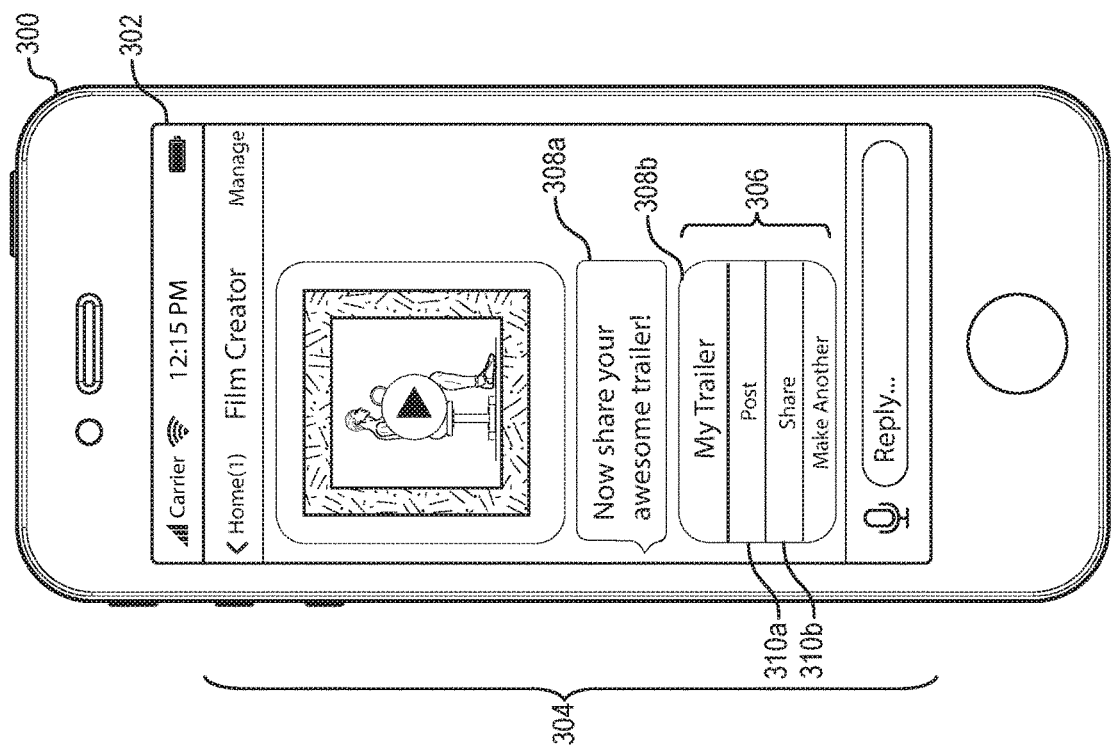

In addition to allowing a user to customize a video trailer for a media production, the video trailer system can also allow a user to share a customized video trailer with other users. Specifically, FIGS. 3A-3B illustrate user interfaces for sharing a customized video trailer with one or more co-users associated with a user. For example, FIG. 3A illustrates a client device 300 including a client application 302 that allows a user to request a customized video trailer within a messaging interface 304, such as client application 208. FIG. 3B then illustrates an interface within the client application 302 for sharing the customized video trailer with one or more co-users. Additionally, while FIGS. 3A-3B illustrate the ability to share trailers with co-users, the video trailer system 102 can allow the user to return and create a new customized video trailer.

In one or more embodiments, after providing the customized video trailer to the user, the video trailer system 102 also allows the user to share the customized video trailer. In particular, FIG. 3A illustrates that, after providing the customized video trailer within a messaging thread of the messaging interface 304, the messaging bot can send a message 306 to the user prompting the user to share the customized video trailer. For example, the message 306 of FIG. 3A includes a first portion 308a prompting the user to share the customized video trailer and a second portion 308b that allows the user to select one or more options for sharing the trailer.

To illustrate, the second portion 308b of the message 306 can include a first sharing element 310a and a second sharing element 310b. The first sharing element 310a can be associated with a networking system such that selecting the first sharing element 310a causes the client device 300 to initiate a process to post the customized video trailer to the networking system. For instance, in response to the user selecting the first sharing element 310a, the client device 300 can open a networking application (e.g., the client application 202 of FIG. 2A) and populate a networking post with the information from the customized video trailer. The user may verify the networking post prior to sending the networking post to co-users connected to the user.

In one or more embodiments, the second sharing element 310b causes the client application 302 to open a sharing interface 312, as illustrated in FIG. 3B. As illustrated, the sharing interface 312 allows the user to share the customized video trailer with one or more co-users using the client application 302. Additionally, in response to the user selecting the second sharing element 310b, the video trailer system can also provide a recommendation of one or more co-users with whom the user can or may want to share the customized video trailer. For example, the sharing interface 312 can include a recommended portion 314 including the one or more recommended co-users.

In one or more embodiments, when determining who to recommend for sharing a customized video trailer, the video trailer system 102 can use social graph information for the user. In particular, the video trailer system 102 can access the social graph to identify relationships between the user and co-users of the networking system (e.g., a social networking system). The social graph information can include information that indicates a strength of the relationship between the user and each co-user. The strength can be determined based on length of relationship, closeness of relationship (family member/relative, friend, coworker, etc.), location, social networking activity involving the user and co-user (e.g., recency/frequency of communications between the user and co-user, whether the user or co-user has shared content with the other, whether the user or co-user has "liked" content by the other), and other relationship cues in connection with the social networking system. Furthermore, the social graph information can include preferences or explicit interests of the user and co-users that allow the video trailer system 102 to identify co-users that have common interests with the user.

Based on the social graph information, the video trailer system 102 can determine one or more co-users for recommending to the user. The video trailer system 102 can also rank the co-users based on the relationship strength, common interests, and/or other criteria that allow the video trailer system 102 to identify the co-users who would most likely be interested in viewing the customized video trailer from the user. The video trailer system 102 can then provide the recommended co-users within the recommended portion 314 according to the ranked order. Alternatively, the video trailer system 102 can provide the recommended co-users based on a recency of communication with the user, or based on any other criteria as may serve a particular embodiment.

The user can then select a send element 316 to send the customized video trailer to a selected co-user. Specifically, sending the customized video trailer to the selected co-user can open a messaging thread (e.g., an existing messaging thread or a new messaging thread) involving the user and the co-user within the client application 302. Additionally, sending the customized video trailer can provide the customized video trailer within the messaging thread involving the user and the co-user as a message from the user to the co-user. The co-user can then view the customized video trailer, as previously described with respect to the user viewing the trailer from the messaging bot.

In addition to allowing a user to share a customized video trailer with one or more co-users, the video trailer system 102 can also allow users to collaboratively customize a video trailer for a media production. In particular, the video trailer system 102 can allow a plurality of users to provide input for customizing the video trailer such that a plurality of users provide input to the video trailer system 102 for customizing the video trailer. For example, the video trailer system 102 can allow a first user to select a characteristic from a first category type and a second user to select a characteristic from a second category type. Accordingly, the video trailer system 102 customizes a video trailer that emphasizes the characteristic selected by the first user and the characteristic selected by the second user.

In one or more embodiments, to collaboratively customize a video trailer, the video trailer system 102 allows a plurality of users to exchange information associated with customizing the video trailer within a messaging application. For example, a first user can begin the process of customizing the video trailer by selecting a characteristic from a first characteristic category (e.g., by exchanging one or more messages with a messaging bot). The first user can send an indication (e.g., a key phrase) of the selection to a second user within a messaging thread involving the first user and the second user. The second user can then select a characteristic from a second characteristic category (e.g., by exchanging one or more messages with the messaging bot). The second user can then provide the selected characteristic back to the first user or continue interacting with a messaging bot to finalize customization of the video trailer.

While the above example corresponds to a process for customizing a video trailer using only two characteristics from two category types between two users, a collaborative customization process can allow any number of users to select characteristics from any number of category types. Accordingly, the users may exchange a plurality of messages for selecting characteristics and exchanging information associated with customizing the video trailer. In one or more alternative embodiments, a plurality of users can initiate a messaging thread (i.e., a group messaging thread) with a messaging bot for customizing a trailer. Within the group messaging thread, the users may take turns selecting characteristics or may vote on characteristics for customizing the trailer. The video trailer system can use the information from the group messaging thread to customize the video trailer and provide the customized video trailer within the messaging thread.

By recommending users to share their customized videos with friends or other co-users, or by allowing users to collaboratively customize video trailers, the video trailer system 102 generates discussion and excitement for the media production. Additionally, generating discussion and excitement for the media production among a plurality of users increases the likelihood of groups of users viewing the media production. Accordingly, the video trailer system 102 can assist the media producer system in extending the reach of video trailers and increasing the personal connection of viewers to the video trailers.

In one or more additional embodiments, the video trailer system 102 also provides information about the media production associated with the customized video trailer to the user. In particular, the video trailer system 102 can allow a user to request information about the release date for the media production, ticketing information, location information, or other information associated with the media production. In one example, the video trailer system 102 can allow the user to request information about the media production from a messaging bot within a messaging thread. The messaging bot can provide the requested information within the messaging thread. For example, the messaging bot can provide ticketing information to the user by sending a message including a link to a website or application associated with the media production.

Figure 4:
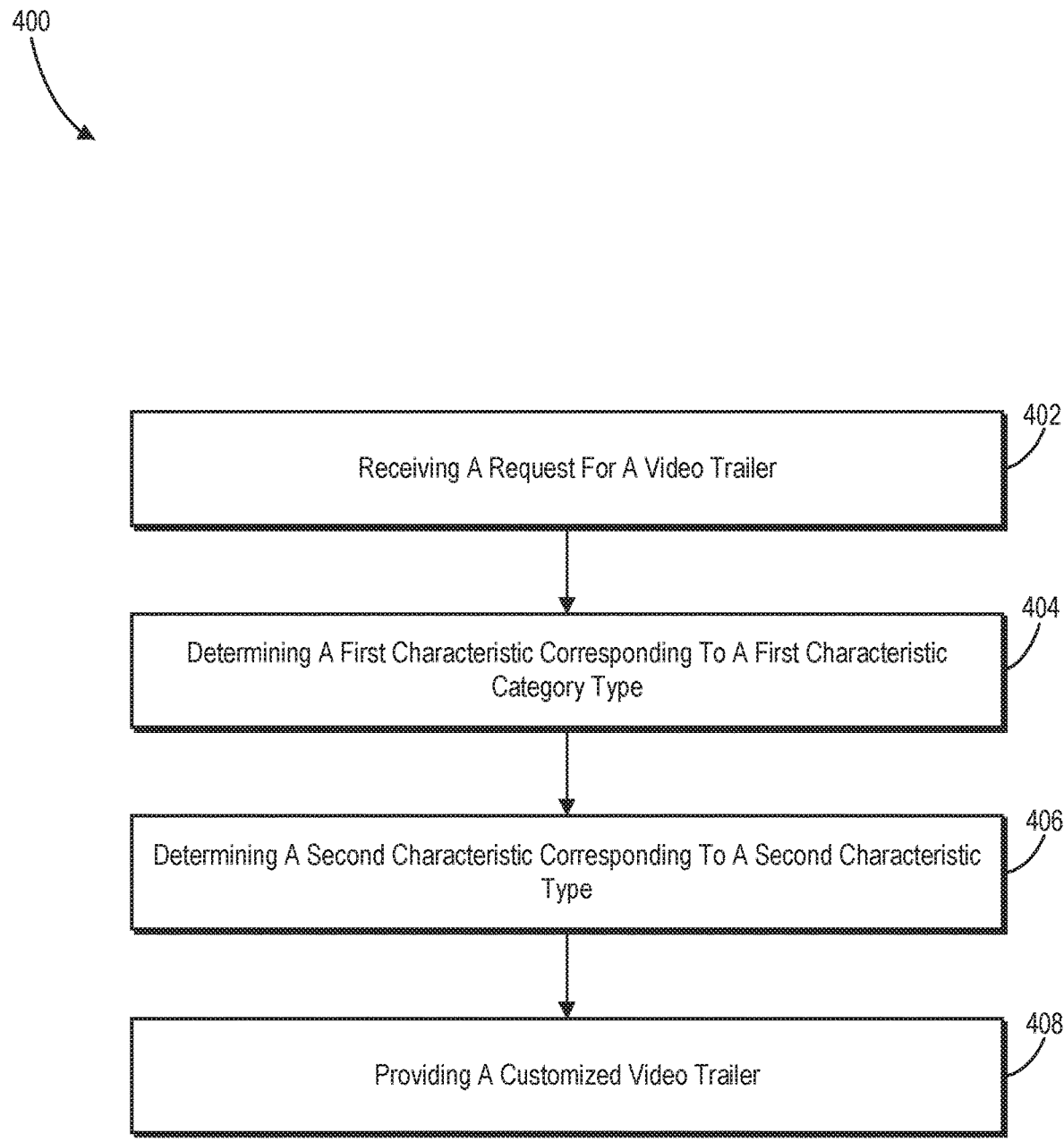
FIG. 4 illustrates a flowchart of a series of acts in a method of customizing a video trailer for a media production in accordance with one or more embodiments.

Turning now to FIG. 4, this figure illustrates a flowchart of a series of acts 400 of customizing a video trailer for a media production in accordance with one or more embodiments. While FIG. 4 illustrates acts according to one embodiment, alternative embodiments may omit, add to, reorder, and/or modify any of the acts shown in FIG. 4. The acts of FIG. 4 can be performed as part of a method. Alternatively, a non-transitory computer readable medium can comprise instructions, that when executed by one or more processors, cause a computing device to perform the acts of FIG. 4. In still further embodiments, a system can perform the acts of FIG. 4.

The series of acts 400 includes an act 402 of receiving a request for a video trailer. For example, act 402 involves receiving, from a client device, a request for a video trailer for a media production. Act 402 can also involve receiving a request to initiate a messaging thread between a user associated with the client device and a messaging bot for the video trailer.

The series of acts 400 also includes an act 404 of determining a first characteristic corresponding to a first characteristic category type. For example, act 404 involves determining, in response to a first selection from the client device, a first characteristic corresponding to a first characteristic category type associated with the media production. Act 404 can also involve receiving an indication of the first characteristic within the messaging thread.

Additionally, the series of acts 400 includes an act 406 of determining a second characteristic corresponding to a second characteristic category type. For example, act 406 involves determining, in response to a second selection from the client device, a second characteristic corresponding to a second characteristic category type associated with the media production. Act 406 can also involve receiving an indication of the second characteristic within the messaging thread.

The series of acts 400 can also include determining, for the media production, a first plurality of characteristics corresponding to the first characteristic category type and a second plurality of characteristics corresponding to the second characteristic category type. For example, the first characteristic category type can include a visual category type of the media production, and the second characteristic category can include an audio category type of the media production. The series of acts 400 can additionally include providing the first plurality of characteristics and the second plurality of characteristics to the client device. For example, the series of acts 400 can include providing the first plurality of characteristics as selectable options within a messaging thread between a user of the client device and a messaging bot, and providing the second plurality of characteristics as selectable options within the messaging thread between the user and the messaging bot after determining the first characteristic.

The series of acts 400 can include mapping the first plurality of characteristics to a plurality of key phrases, receiving, from the client device, a message comprising a key phrase corresponding to a characteristic from the first plurality of characteristics, and selecting the characteristic corresponding to the key phrase as the first characteristic.

Furthermore, the series of acts 400 can include determining, by analyzing a social networking profile of a user of the client device, one or more interests of the user based on actions of the user within a social networking system. The series of acts 400 can then include providing, based on the one or more interests of the user, a first characteristic subset from the first plurality of characteristics and a second characteristic subset from the second plurality of characteristics to the client device.

The series of acts 400 also includes an act 408 of providing a customized video trailer. For example, act 408 involves providing, to the client device in connection with the request, a customized video trailer for the media production that comprises content emphasizing the first characteristic and the second characteristic. For instance, the customized video trailer includes content emphasizing a visual characteristic corresponding to the first characteristic of the visual category type and an audio characteristic corresponding to the second characteristic of the audio category type. Act 408 can also involve providing the customized video trailer within the messaging thread as a response from the messaging bot to the user.

The series of acts 400 can also include generating the customized video trailer for the media production in response to determining the first characteristic and the second characteristic. For example, the series of acts 400 can include generating the customized video trailer on-demand in response to determining the first characteristic and the second characteristic. Generating the customized video trailer on-demand can involve generating the customized video trailer from a plurality of content items in a repository of content items associated with the media production. For example, the content items can include video clips or audio tracks.

The series of acts 400 can alternatively include selecting a previously generated video trailer to provide to the client device. For example, the series of acts 400 can include selecting the previously generated video trailer from a plurality of previously generated video trailers, wherein the plurality of previously generated video trailers comprises a video trailer for each possible combination of user-selected characteristics.

The series of acts 400 can also include determining one or more co-users associated with a user of a client device who are likely to have an interest in the customized video trailer based on a social graph of a social networking system, the social graph comprising a plurality of nodes representing users of the social networking system and a plurality of edges representing relationships between the plurality of nodes. The series of acts 400 can also include providing, to the client device, a recommendation to share the customized video trailer with the one or more co-users.

Figure 5:
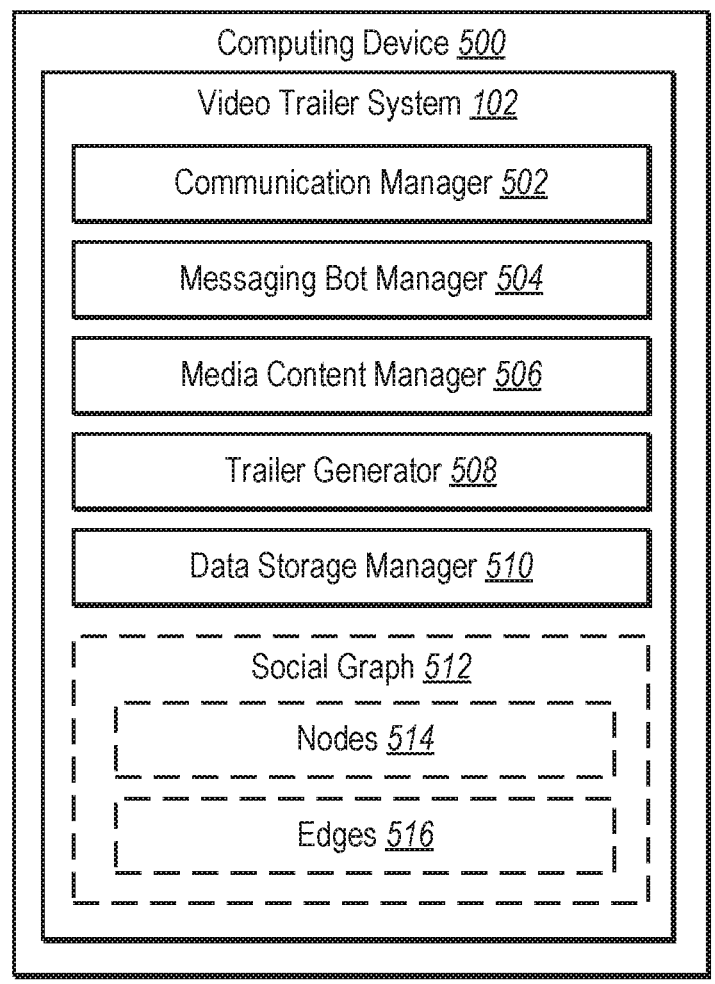
FIG. 5 illustrates a detailed schematic diagram of a computing device including the video trailer system of FIG. 1 in accordance with one or more embodiments.

FIG. 5 illustrates a schematic diagram illustrating a video trailer system 102 in accordance with an embodiment. In particular, FIG. 5 illustrates that the video trailer system 102 can be part of a computer device 500. Additionally, the video trailer system 102 can include a communication manager 502, a messaging bot manager 504, a media content manager 506, a trailer generator 508, and a data storage manager 510. The video trailer system 102 can be implemented on any number of computing devices (e.g., server device(s) 108 and/or client device 106). For example, the video trailer system 102 can be implemented in a distributed system of server devices for a social networking system or a messaging system. Alternatively, the video trailer system 102 can be implemented on a single computing device such as a client device of a user.

Additionally, the video trailer system 102 can optionally include a social graph 512 associated with a social networking system. The social graph 512 can include nodes 514, which include node information for users, concepts, and items. The social graph 512 can also include edges 516, which include edge information describing relationships between nodes 514 and/or actions occurring within a social networking system. Further detail regarding social networking systems, social graphs, edges, and nodes is presented below with respect to FIG. 6.

The components of the video trailer system 102 can include software, hardware, or both. For example, the components of the video trailer system 102 can include one or more instructions stored on a computer-readable storage medium and executable by processors of one or more computing devices (e.g., the computing device(s) 600). When executed by the one or more processors, the computer-executable instructions of the video trailer system 102 can cause the computing device(s) 600 to perform the video trailer customization methods described herein. Alternatively, the components of the video trailer system 102 can comprise hardware, such as a special purpose processing device to perform a certain function or group of functions. Additionally, or alternatively, the components of the video trailer system 102 can include a combination of computer-executable instructions and hardware.

Furthermore, the components of the video trailer system 102 performing the functions described herein with respect to the video trailer system 102 may, for example, be implemented as part of a stand-alone application (e.g., a messaging application), as a module of an application, as a plug-in for applications including content management applications, as a library function or functions that may be called by other applications, and/or as a cloud-computing model. Thus, the components of the video trailer system 102 may be implemented as part of a stand-alone application on a personal computing device or a mobile device.

As mentioned, the video trailer system 102 can include a communication manager 502. The communication manager 502 can facilitate communications between the video trailer system 102 can one or more other systems or devices. For example, the communication manager 502 can communicate with a media producer system to obtain content associated with customizing video trailers. Additionally, the communication manager 502 can communicate with a client device of a user to receive messages from the client device and send messages to the client device. Accordingly, the communication manager 502 can receive indicators of selections of characteristics in customizing a video trailer.

The video trailer system 102 can include a messaging bot manager 504 to facilitate the management of a messaging bot in connection with customizing video trailers.

Specifically, the messaging bot manager 504 can train a messaging bot to interact with users within messaging threads to interpret messages from the user. Additionally, the messaging bot manager 504 can train the messaging bot to send messages to the user in connection with a process for customizing a video trailer. The messaging bot manager 504 can manage a plurality of messaging bots, each messaging bot for a different media production.

Additionally, the video trailer system 102 can include a media content manager 506 to facilitate the management of media content used in customizing video trailers for media productions. In particular, the media content manager 506 can manage content items (e.g., trailers or parts of trailers) that the video trailer system 102 uses in customizing video trailers. For example, the media content manager 506 can manage a list of content items available from a media producer system or within another database (e.g., in the data storage manager 510) for customizing a video trailer. Additionally, the media content manager 506 can determine characteristics of the content items and mapping characteristics to the content items.

The video trailer system 102 can also include a trailer generator 508 to facilitate generation of customized video trailers. For instance, the trailer generator 508 can generate customized video trailers based on user-selected characteristics by accessing a mapping of characteristics to content items from the media content manager 506. Alternatively, the trailer generator 508 can generate a customized video trailer by applying one or more effects to a previously generated video trailer.

The video trailer system 102 also includes a data storage manager 510 (that includes a non-transitory computer memory) that stores and maintains data associated with customizing video trailers. For example, the data storage manager 510 can include a database that maintains content items, as previously mentioned. The data storage manager 510 can also store customized video trailers for users. Additionally, the data storage manager 510 can store information associated with the users, such as user profiles, interests/preferences, previous selections of characteristics for customized video trailers, or the like. Furthermore, the data storage manager 510 can store information associated with the messaging bot, including a machine-learning model or neural network.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
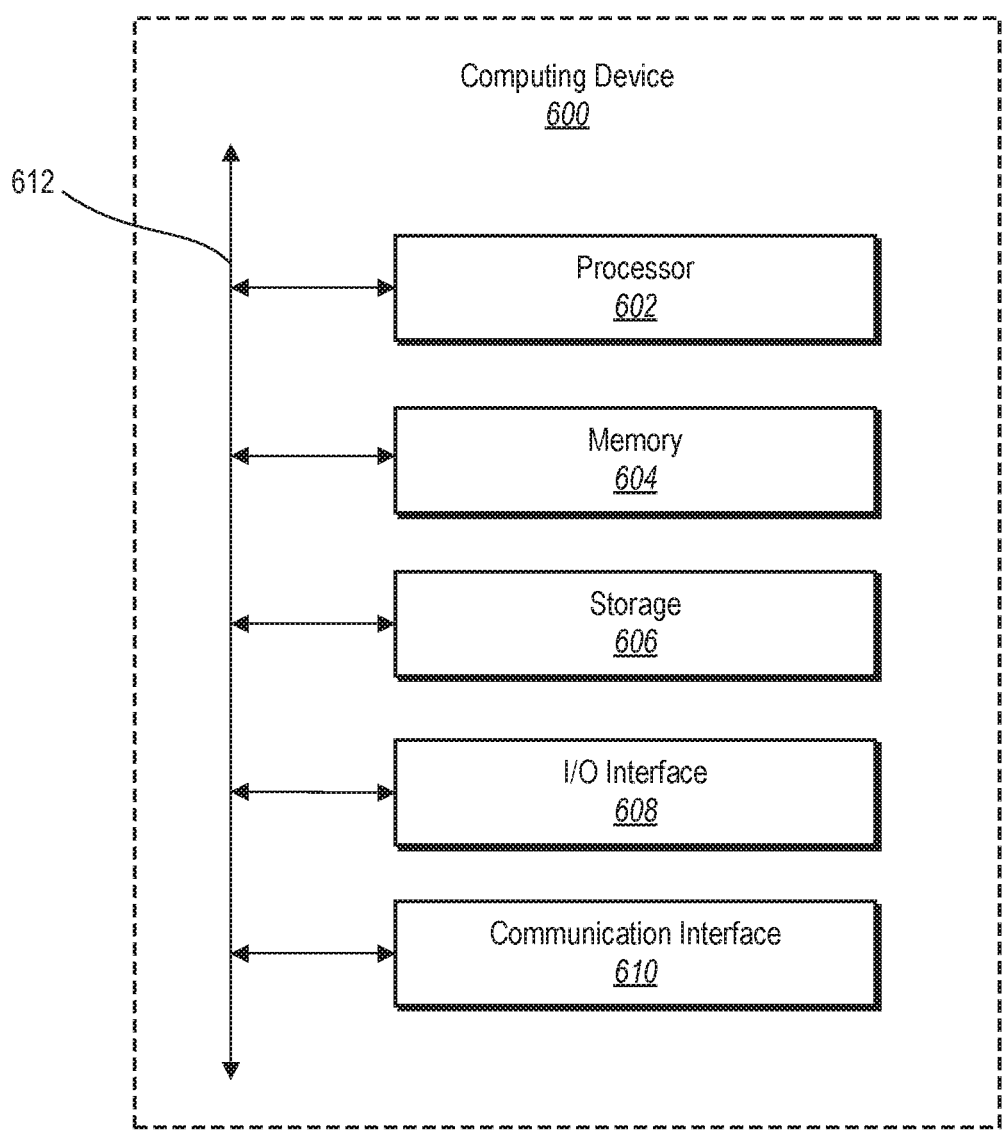
FIG. 6 illustrates a block diagram of an exemplary computing device in accordance with one or more embodiments.

FIG. 6 illustrates a block diagram of exemplary computing device 600 that may be configured to perform one or more of the processes described above. One will appreciate that one or more computing devices such as the computing device 600 may implement the video trailer system 102. As shown by FIG. 6, the computing device 600 can comprise a processor 602, a memory 604, a storage device 606, an I/O interface 608, and a communication interface 610, which may be communicatively coupled by way of a communication infrastructure 612. In certain embodiments, the computing device 600 can include fewer or more components than those shown in FIG. 6. Components of the computing device 600 shown in FIG. 6 will now be described in additional detail.

In one or more embodiments, the processor 602 includes hardware for executing instructions, such as those making up a computer program. As an example, and not by way of limitation, to execute instructions for dynamically modifying workflows, the processor 602 may retrieve (or fetch) the instructions from an internal register, an internal cache, the memory 604, or the storage device 606 and decode and execute them. The memory 604 may be a volatile or non-volatile memory used for storing data, metadata, and programs for execution by the processor(s). The storage device 606 includes storage, such as a hard disk, flash disk drive, or other digital storage device, for storing data or instructions for performing the methods described herein.

The I/O interface 608 allows a user to provide input to, receive output from, and otherwise transfer data to and receive data from computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example, and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 610 may facilitate communications with various types of wired or wireless networks. The communication interface 610 may also facilitate communications using various communication protocols. The communication infrastructure 612 may also include hardware, software, or both that couples components of the computing device 600 to each other. For example, the communication interface 610 may use one or more networks and/or protocols to enable a plurality of computing devices connected by a particular infrastructure to communicate with each other to perform one or more aspects of the processes described herein. To illustrate, the asset and attribute management process can allow a plurality of devices (e.g., a client device and server devices) to exchange information using various communication networks and protocols for sharing information such as assets, attributes, marketing content, and analytics data.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

As mentioned above, the video trailer system 102 can be associated with a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, on-line calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings.

Figure 7:
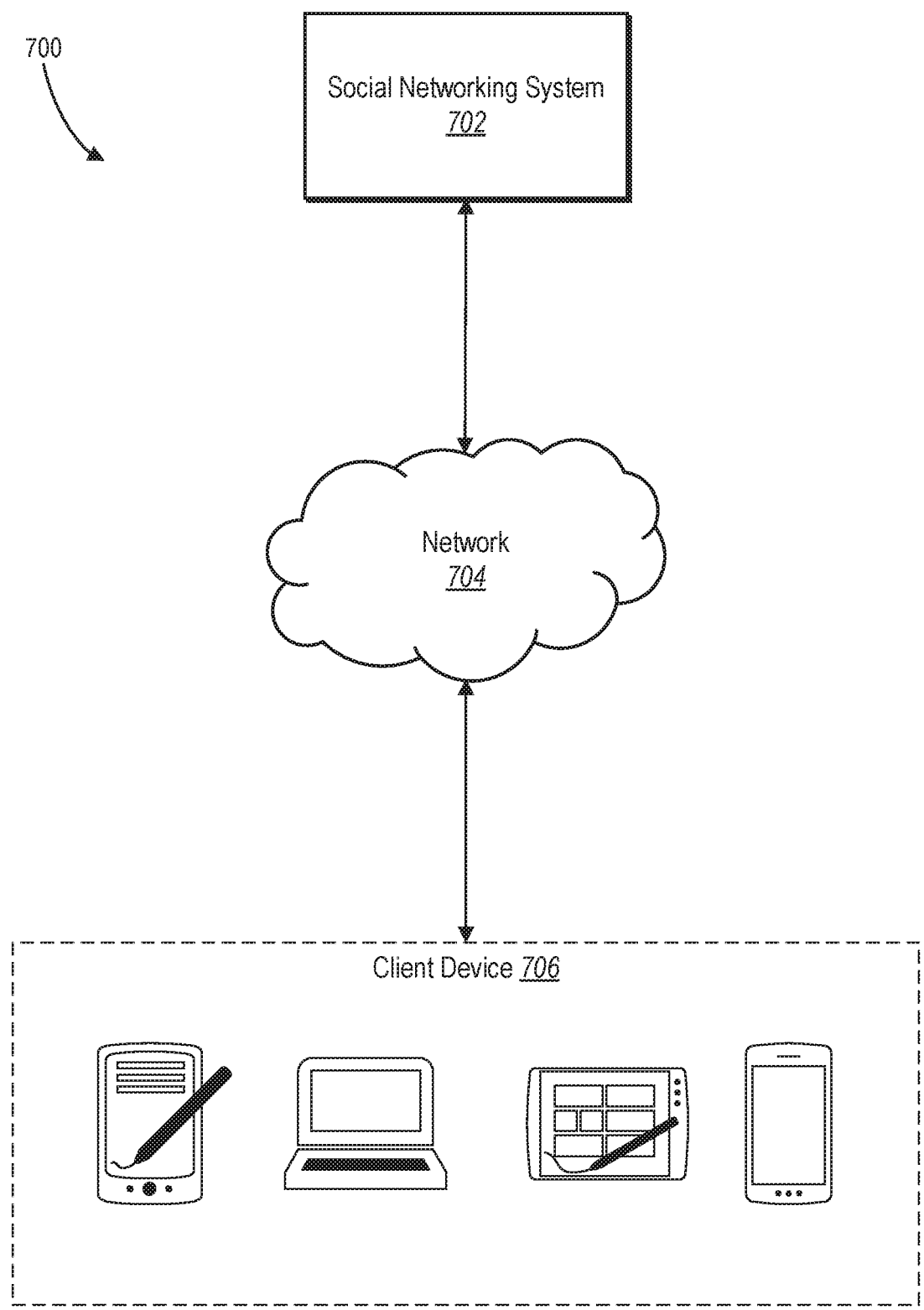
FIG. 7 illustrates an example network environment of a social networking system in accordance with one or more embodiments.

FIG. 7 illustrates an example network environment 700 of a networking system (e.g., social networking system 702). Network environment 700 includes a client system 706 and a social networking system 702 connected to each other by a network 704. Although FIG. 7 illustrates a particular arrangement of client system 706, social networking system 702, and network 704, this disclosure contemplates any suitable arrangement of client system 706, social networking system 702, and network 704. As an example, and not by way of limitation, two or more of client system 706 and social networking system 702 may be connected to each other directly, bypassing network 704. As another example, two or more of client system 706 and social networking system 702 may be physically or logically co-located with each other in whole or in part. Moreover, although FIG. 7 illustrates a particular number of client systems 706, social networking systems 702, and networks 704, this disclosure contemplates any suitable number of client systems 706, social networking systems 702, and networks 704. As an example, and not by way of limitation, network environment 700 may include multiple client system 706, social networking systems 702, and networks 704.

This disclosure contemplates any suitable network 704. As an example, and not by way of limitation, one or more portions of network 704 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 704 may include one or more networks 704.

Links may connect client system 706 and social networking system 702 to communication network 704 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, client system 706 may be an electronic device including hardware, software, or embedded logic components or a combination of two or more such components and capable of carrying out the appropriate functionalities implemented or supported by client system 706. As an example, and not by way of limitation, a client system 706 may include any of the computing devices discussed above in relation to FIG. 7. A client system 706 may enable a network user at client system 706 to access network 704. A client system 706 may enable its user to communicate with other users at other client systems 706.

In particular embodiments, client system 706 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 706 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client system 706 one or more Hyper Text Markup Language (HTML) files responsive to the HTTP request. Client system 706 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social networking system 702 may be a network-addressable computing system that can host an online social network. Social networking system 702 may generate, store, receive, and send social networking data, such as, for example, user-profile data, concept-profile data, social-graph information, or other suitable data related to the online social network. Social networking system 702 may be accessed by the other components of network environment 700 either directly or via network 704. In particular embodiments, social networking system 702 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social networking system 702 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 706, a social networking system 702, or a third-party system to manage, retrieve, modify, add, or delete, the information stored in data store.

In particular embodiments, social networking system 702 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social networking system 702 may provide users of the online social network the ability to communicate and interact with other users. In particular embodiments, users may join the online social network via social networking system 702 and then add connections (e.g., relationships) to a number of other users of social networking system 702 whom they want to be connected to. Herein, the term "friend" may refer to any other user of social networking system 702 with whom a user has formed a connection, association, or relationship via social networking system 702.

In particular embodiments, social networking system 702 may provide users with the ability to take actions on various types of items or objects, supported by social networking system 702. As an example, and not by way of limitation, the items and objects may include groups or social networks to which users of social networking system 702 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social networking system 702 or by an external system of a third-party system, which is separate from social networking system 702 and coupled to social networking system 702 via a network 704.

In particular embodiments, social networking system 702 may be capable of linking a variety of entities. As an example, and not by way of limitation, social networking system 702 may enable users to interact with each other as well as receive content from third-party systems or other entities, or to allow users to interact with these entities through an application programming interfaces (API) or other communication channels.

In particular embodiments, a third-party system may include one or more types of servers, one or more data stores, one or more interfaces, including but not limited to APIs, one or more web services, one or more content sources, one or more networks, or any other suitable components, e.g., that servers may communicate with. A third-party system may be operated by a different entity from an entity operating social networking system 702. In particular embodiments, however, social networking system 702 and third-party systems may operate in conjunction with each other to provide social networking services to users of social networking system 702. In this sense, social networking system 702 may provide a platform, or backbone, which other systems, such as third-party systems, may use to provide social networking services and functionality to users across the Internet.

In particular embodiments, a third-party system may include a third-party content object provider. A third-party content object provider may include one or more sources of content objects, which may be communicated to a client system 706. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social networking system 702 also includes user-generated content objects, which may enhance a user's interactions with social networking system 702. User-generated content may include anything a user can add, upload, send, or "post" to social networking system 702. As an example, and not by way of limitation, a user communicates posts to social networking system 702 from a client system 706. Posts may include data such as status updates or other textual data, location information, photos, videos, links, music or other similar data or media. Content may also be added to social networking system 702 by a third-party through a "communication channel," such as a newsfeed or stream.

In particular embodiments, social networking system 702 may include a variety of servers, sub-systems, programs, modules, logs, and data stores. In particular embodiments, social networking system 702 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social networking system 702 may also include suitable components such as network interfaces, security mechanisms, load balancers, failover servers, management-and-network-operations consoles, other suitable components, or any suitable combination thereof. In particular embodiments, social networking system 702 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example, and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social networking system 702 to one or more client systems 706 or one or more third-party system via network 704. The web server may include a mail server or other messaging functionality for receiving and routing messages between social networking system 702 and one or more client systems 706. An API-request server may allow a third-party system to access information from social networking system 702 by calling one or more APIs. An action logger may be used to receive communications from a web server about a user's actions on or off social networking system 702. In conjunction with the action log, a third-party-content-object log may be maintained of user exposures to third-party-content objects. A notification controller may provide information regarding content objects to a client system 706. Information may be pushed to a client system 706 as notifications, or information may be pulled from client system 706 responsive to a request received from client system 706. Authorization servers may be used to enforce one or more privacy settings of the users of social networking system 702. A privacy setting of a user determines how particular information associated with a user can be shared. The authorization server may allow users to opt in to or opt out of having their actions logged by social networking system 702 or shared with other systems, such as, for example, by setting appropriate privacy settings. Third-party-content-object stores may be used to store content objects received from third parties, such as a third-party system. Location stores may be used for storing location information received from client systems 706 associated with users. Advertisement-pricing modules may combine social information, the current time, location information, or other suitable information to provide relevant advertisements, in the form of notifications, to a user.

Figure 8:
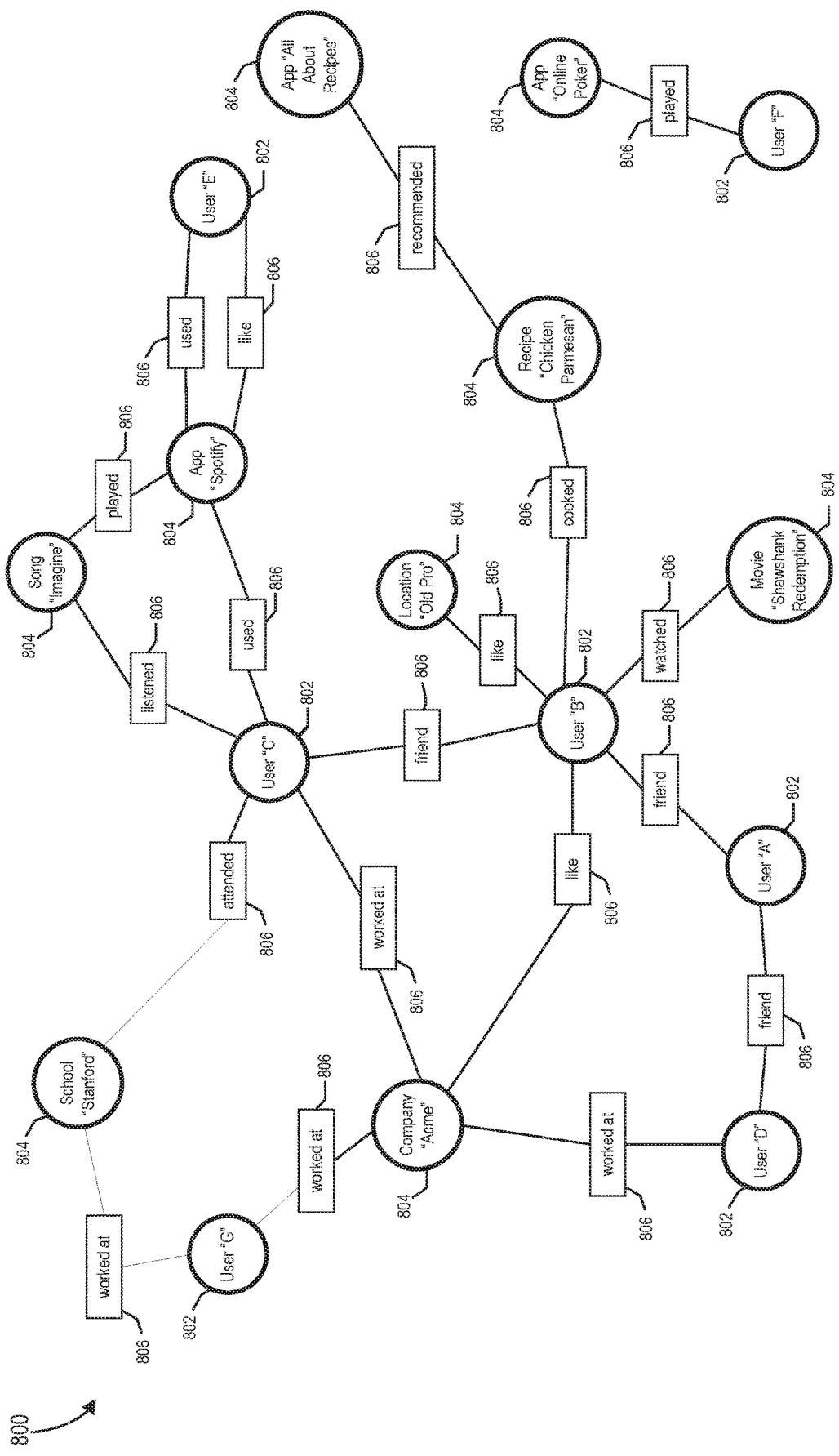
FIG. 8 illustrates an example social graph for a social networking system in accordance with one or more embodiments.

FIG. 8 illustrates example social graph 800. In particular embodiments, social networking system 702 may store one or more social graphs 800 in one or more data stores. In particular embodiments, social graph 800 may include multiple nodes—which may include multiple user nodes 802 or multiple concept nodes 804—and multiple edges 806 connecting the nodes. Example social graph 800 illustrated in FIG. 8 is shown, for didactic purposes, in a two-dimensional visual map representation. In particular embodiments, a social networking system 702, client system 706, or third-party system may access social graph 800 and related social-graph information for suitable applications. The nodes and edges of social graph 800 may be stored as data objects, for example, in a data store (such as a social-graph database). Such a data store may include one or more searchable or query able indexes of nodes or edges of social graph 800.

In particular embodiments, a user node 802 may correspond to a user of social networking system 702. As an example, and not by way of limitation, a user may be an individual (human user), an entity (e.g., an enterprise, business, or third-party application), or a group (e.g., of individuals or entities) that interacts or communicates with or over social networking system 702. In particular embodiments, when a user registers for an account with social networking system 702, social networking system 702 may create a user node 802 corresponding to the user, and store the user node 802 in one or more data stores. Users and user nodes 802 described herein may, where appropriate, refer to registered users and user nodes 802 associated with registered users. In addition, or as an alternative, users and user nodes 802 described herein may, where appropriate, refer to users that have not registered with social networking system 702. In particular embodiments, a user node 802 may be associated with information provided by a user or information gathered by various systems, including social networking system 702. As an example, and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 702 or a third-party website associated with a web-application server); an entity (such as, for example, a person, business, group, sports team, or celebrity); a resource (such as, for example, an audio file, video file, digital photo, text file, structured document, or application) which may be located within social networking system 702 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including social networking system 702. As an example, and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social networking system 702. Profile pages may also be hosted on third-party websites associated with a third-party system. As an example, and not by way of limitation, a profile page corresponding to a particular external webpage may be the particular external webpage and the profile page may correspond to a particular concept node 804. Profile pages may be viewable by all or a selected subset of other users. As an example, and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example, and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 706 to send to social networking system 702 a message indicating the user's action. In response to the message, social networking system 702 may create an edge (e.g., an "eat" edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example, and not by way of limitation, a first user may indicate that a second user is a "friend" of the first user. In response to this indication, social networking system 702 may send a "friend request" to the second user. If the second user confirms the "friend request," social networking system 702 may create an edge 806 connecting the first user's user node 802 to the second user's user node 802 in social graph 800 and store edge 806 as social-graph information in one or more of data stores. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example, and not by way of limitation, an edge 806 may represent a friendship, family relationship, business or employment relationship, fan relationship, follower relationship, visitor relationship, sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806.

In particular embodiments, an edge 806 between a user node 802 and a concept node 804 may represent a particular action or activity performed by a user associated with user node 802 toward a concept associated with a concept node 804. As an example, and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social networking system 702 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 702 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social networking system 702 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example, and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social networking system 702 may create an edge 806 between a user node 802 and a concept node 804 in social graph 800. As an example and not by way of limitation, a user viewing a concept-profile page (such as, for example, by using a web browser or a special-purpose application hosted by the user's client system 706) may indicate that he or she likes the concept represented by the concept node 804 by clicking or selecting a "Like" icon, which may cause the user's client system 706 to send to social networking system 702 a message indicating the user's liking of the concept associated with the concept-profile page. In response to the message, social networking system 702 may create an edge 806 between user node 802 associated with the user and concept node 804, as illustrated by "like" edge 806 between the user and concept node 804. In particular embodiments, social networking system 702 may store an edge 806 in one or more data stores. In particular embodiments, an edge 806 may be automatically formed by social networking system 702 in response to a particular user action. As an example, and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition, or as an alternative, an advertisement may be one or more sponsored stories (e.g., a news-feed or ticker item on social networking system 702). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example, and not by way of limitation, advertisements may be included among the search results of a search-results page, where sponsored content is promoted over non-sponsored content.

In particular embodiments, an advertisement may be requested for display within social networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition, or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 702 may execute or modify a particular action of the user.

An advertisement may also include social networking-system functionality that a user may interact with. As an example, and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 702) or RSVP (e.g., through social networking system 702) to an event associated with the advertisement. In addition, or as an alternative, an advertisement may include social networking-system context directed to the user. As an example, and not by way of limitation, an advertisement may display information about a friend of the user within social networking system 702 who has taken an action associated with the subject matter of the advertisement.

In particular embodiments, social networking system 702 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 702 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 702 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example, and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 90% of the overall coefficient, while the relationship between the user and the object may comprise 40% of the overall coefficient. In particular embodiments, the social networking system 702 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example, and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 702 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 702 may calculate a coefficient based on a user's actions. Social networking system 702 may monitor such actions on the online social network, on a third-party system, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 702 may calculate a coefficient based on the user's actions with particular types of content. The content may be associated with the online social network, a third-party system, or another suitable system. The content may include users, profile pages, posts, news stories, headlines, instant messages, chat room conversations, emails, advertisements, pictures, video, music, other suitable objects, or any combination thereof. Social networking system 702 may analyze a user's actions to determine whether one or more of the actions indicate an affinity for subject matter, content, other users, and so forth. As an example, and not by way of limitation, if a user may make frequently posts content related to "coffee" or variants thereof, social networking system 702 may determine the user has a high coefficient with respect to the concept "coffee". Particular actions or types of actions may be assigned a higher weight and/or rating than other actions, which may affect the overall calculated coefficient. As an example, and not by way of limitation, if a first user emails a second user, the weight or the rating for the action may be higher than if the first user simply views the user-profile page for the second user.

In particular embodiments, social networking system 702 may calculate a coefficient based on the type of relationship between particular objects. Referencing the social graph 800, social networking system 702 may analyze the number and/or type of edges 806 connecting particular user nodes 802 and concept nodes 804 when calculating a coefficient. As an example, and not by way of limitation, user nodes 802 that are connected by a spouse-type edge (representing that the two users are married) may be assigned a higher coefficient than user nodes 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example, and not by way of limitation, if a user is tagged in first photo, but merely likes a second photo, social networking system 702 may determine that the user has a higher coefficient with respect to the first photo than the second photo because having a tagged-in-type relationship with content may be assigned a higher weight and/or rating than having a like-type relationship with content. In particular embodiments, social networking system 702 may calculate a coefficient for a first user based on the relationship one or more second users have with a particular object. In other words, the connections and coefficients other users have with an object may affect the first user's coefficient for the object. As an example, and not by way of limitation, if a first user is connected to or has a high coefficient for one or more second users, and those second users are connected to or have a high coefficient for a particular object, social networking system 702 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 800. As an example, and not by way of limitation, social-graph entities that are closer in the social graph 800 (i.e., fewer degrees of separation) may have a higher coefficient than entities that are further apart in the social graph 800.

In particular embodiments, social networking system 702 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 706 of the user). A first user may be more interested in other users or concepts that are closer to the first user. As an example, and not by way of limitation, if a user is one mile from an airport and two miles from a gas station, social networking system 702 may determine that the user has a higher coefficient for the airport than the gas station based on the proximity of the airport to the user.

In particular embodiments, social networking system 702 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 702 may provide information that is relevant to user's interests and current circumstances, increasing the likelihood that they will find such information of interest. In particular embodiments, social networking system 702 may generate content based on coefficient information. Content objects may be provided or selected based on coefficients specific to a user. As an example, and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 702 may generate search results based on coefficient information. Search results for a particular user may be scored or ranked based on the coefficient associated with the search results with respect to the querying user. As an example, and not by way of limitation, search results corresponding to objects with higher coefficients may be ranked higher on a search-results page than results corresponding to objects having lower coefficients.

In particular embodiments, social networking system 702 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system (e.g., via an API or other communication channel), or from another suitable system. In response to the request, social networking system 702 may calculate the coefficient (or access the coefficient information if it has previously been calculated and stored). In particular embodiments, social networking system 702 may measure an affinity with respect to a particular process. Different processes (both internal and external to the online social network) may request a coefficient for a particular object or set of objects. Social networking system 702 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/642,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example, and not by way of limitation, a particular concept node 804 corresponding to a particular photo may have a privacy setting specifying that the photo may only be accessed by users tagged in the photo and their friends. In particular embodiments, privacy settings may allow users to opt in or opt out of having their actions logged by social networking system 702 or shared with other systems (e.g., third-party system). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 702 may send a request to the data store for the object. The request may identify the user associated with the request and may only be sent to the user (or a client system 706 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
    receiving, by one or more servers from a client device via a messaging thread, a request for the one or more servers to generate a video trailer for a media production, the video trailer comprising a preview video that combines a customized subset of video clips of a plurality of video clips comprising separate scenes in the media production, wherein the media production is a movie, a television program, or a streaming video program;
    providing, by the one or more servers to the client device in response to the request and within the messaging thread, a first set of characteristics of a first characteristic category type associated with the media production and a second set of characteristics of a second characteristic category type associated with the media production for determining the customized subset of video clips;
    determining, by the one or more servers in response to receiving a first characteristic selection from the first set of characteristics from the client device via the messaging thread in connection with the request, a first characteristic for customizing the video trailer for display on the client device, the first characteristic corresponding to the first characteristic category type associated with the media production;
    determining, by the one or more servers in response to receiving a second characteristic selection from the second set of characteristics from the client device via the messaging thread in connection with the request, a second characteristic for customizing the video trailer for display on the client device, the second characteristic corresponding to the second characteristic category type associated with the media production;
    selecting, by the one or more servers, the customized subset of video clips from the plurality of video clips comprising separate scenes in the media production by selecting a first video clip of the plurality of video clips and a second video clip of the plurality of video clips, wherein the first video clip comprises content emphasizing the first characteristic and the second video clip comprises content emphasizing the second characteristic; and
    providing, by the one or more servers to the client device via the messaging thread in connection with the request, a customized video trailer for the media production that combines the first video clip and the second video clip comprising content emphasizing the first characteristic and the second characteristic into a single video trailer.

2. The method as recited in claim 1, further comprising:
    providing, to the client device in response to the request and within the messaging thread, a set of music genres associated with the media production;
    determining, in response to receiving a music genre selection from the client device, a music genre for customizing the video trailer for display on the client device;
    selecting an audio track corresponding to the music genre based on the music genre selection; and
    wherein the customized video trailer includes the selected audio track.

3. The method as recited in claim 1, wherein:
    receiving the request for the video trailer comprises receiving a request to initiate the messaging thread between a user associated with the client device and a messaging bot for the video trailer; and
    providing the customized video trailer comprises providing the customized video trailer within the messaging thread as a response from the messaging bot to the user.

4. The method as recited in claim 1, wherein providing the first set of characteristics to the client device comprises providing a horizontally scrollable list of options within the messaging thread between a user of the client device and a messaging bot.

5. The method as recited in claim 1, wherein providing the first set of characteristics and the second set of characteristics to the client device comprises:
    providing the first set of characteristics as selectable options within the messaging thread between a user of the client device and a messaging bot by providing the selectable options for the first set of characteristics as one or more messages from the messaging bot to the user within the messaging thread; and
    providing the second set of characteristics as selectable options within the messaging thread between the user and the messaging bot after determining the first characteristic by providing the selectable options for the second set of characteristics as one or more messages from the messaging bot to the user within the messaging thread.

6. The method as recited in claim 1, wherein determining the first characteristic comprises:
    mapping the first set of characteristics to a plurality of key phrases;
    receiving, from the client device, a message comprising a key phrase corresponding to a characteristic from the first set of characteristics; and
    selecting the characteristic corresponding to the key phrase as the first characteristic.

7. The method as recited in claim 1, wherein providing the first set of characteristics and the second set of characteristics to the client device comprises:
    determining, by analyzing a social networking profile of a user of the client device, one or more interests of the user based on actions of the user within a social networking system; and
    providing, based on the one or more interests of the user, a first characteristic subset from the first set of characteristics and a second characteristic subset from the second set of characteristics to the client device.

8. The method as recited in claim 1, further comprising: determining one or more co-users associated with a user of the client device who are likely to have an interest in the customized video trailer based on a social graph of a social networking system, the social graph comprising a plurality of nodes representing users of the social networking system and a plurality of edges representing relationships between the plurality of nodes; and providing, to the client device, a recommendation to share the customized video trailer with the one or more co-users.

9. The method as recited in claim 1, wherein the first characteristic category type comprises a visual category type of the media production and the second characteristic category type comprises an audio category type of the media production.

10. The method as recited in claim 9, wherein the customized video trailer comprises the first video clip emphasizing a visual characteristic corresponding to the first characteristic of the visual category type and the second video clip emphasizes an audio characteristic corresponding to the second characteristic of the audio category type.

11. A non-transitory computer readable storage medium comprising instructions that, when executed by at least one processor, cause a computer system to:
receive, from a client device via a messaging thread, a request for one or more servers to generate a video trailer for a media production, the video trailer comprising a preview video that combines a customized subset of video clips of a plurality of video clips comprising separate scenes in the media production, wherein the media production is a movie, a television program, or a streaming video program;
provide, to the client device in response to the request and within the messaging thread, a first set of characteristics of a first characteristic category type associated with the media production and a second set of characteristics of a second characteristic category type associated with the media production for determining the customized subset of video clips;
determine, in response to receiving a first characteristic selection from the first set of characteristics from the client device via the messaging thread in connection with the request, a first characteristic for customizing the video trailer for display on the client device, the first characteristic corresponding to the first characteristic category type associated with the media production;
determine, in response to receiving a second characteristic selection from the second set of characteristics from the client device via the messaging thread in connection with the request, a second characteristic for customizing the video trailer for display on the client device, the second characteristic corresponding to the second characteristic category type associated with the media production;
select the customized subset of video clips from the plurality of video clips comprising separate scenes in the media production by selecting a first video clip of the plurality of video clips and a second video clip of the plurality of video clips, wherein the first video clip comprises content emphasizing the first characteristic and the second video clip comprises content emphasizing the second characteristic; and
provide, to the client device in connection with the request via the messaging thread, a customized video trailer for the media production that combines the first video clip and the second video clip comprising content emphasizing the first characteristic and the second characteristic into a single video trailer.

12. The non-transitory computer readable storage medium as recited in claim 11, further comprising instructions that, when executed by the at least one processor, cause the computer system to generate the customized video trailer for the media production in response to determining the first characteristic and the second characteristic by:
identifying, based on the first characteristic and the second characteristic, the first video clip, the second video clip, and at least one audio track; and
processing the first video clip, the second video clip, and the at least one audio track to generate the customized video trailer.

13. The non-transitory computer readable storage medium as recited in claim 11, further comprising instructions that, when executed by the at least one processor, cause the computer system to provide the customized video trailer by selecting, based on the first characteristic and the second characteristic, a previously generated video trailer that combines the first video clip and the second video clip to provide to the client device.

14. The non-transitory computer readable storage medium as recited in claim 11, wherein the instructions that cause the computer system to provide the first set of characteristics to the client device cause the computer system to provide a horizontally scrollable list of options within the messaging thread between a user of the client device and a messaging bot.

15. The non-transitory computer readable storage medium as recited in claim 11, further comprising instructions that, when executed by the at least one processor, cause the computer system to:
determine one or more co-users associated with a user of the client device who are likely to have an interest in the customized video trailer based on a social graph of a social networking system, the social graph comprising a plurality of nodes representing users of the social networking system and a plurality of edges representing relationships between the plurality of nodes; and
provide, to the client device, a recommendation to share the customized video trailer with the one or more co-users.

16. The non-transitory computer readable storage medium as recited in claim 11, wherein the instructions that cause the computer system to provide the first set of characteristic and the second set of characteristics to the client device cause the computer system to:
provide the first set of characteristics as selectable options within the messaging thread involving a user of the client device by providing the selectable options for the first set of characteristics as one or more messages from the messaging bot to the user within the messaging thread; and
provide the second set of characteristics as selectable options within the messaging thread after determining the first characteristic by providing the selectable options for the second set of characteristics as one or more messages from the messaging bot to the user within the messaging thread.

17. The non-transitory computer readable storage medium as recited in claim 11, further comprising instructions that, when executed by the at least one processor, cause the computer system to:

receive, from the client device, a request to initiate the messaging thread between a user of the client device and a messaging bot;

provide, to the client device, the customized video trailer within the messaging thread as a response from the messaging bot to the user.

18. The non-transitory computer readable storage medium as recited in claim 11, wherein each of the first characteristic category type and the second characteristic category type comprises a character category, an actor category, a music category, an emotion category, or a trailer design category.

19. A system comprising:

at least one processor; and a non-transitory computer readable storage medium comprising instructions that, when executed by the at least one processor, cause the system to:

receive, from a client device via a messaging thread, a request for one or more servers to generate a video trailer for a media production, the video trailer comprising a preview video that combines a customized subset of video clips of a plurality of video clips comprising separate scenes the media production, wherein the media production is a movie, a television program, or a streaming video program;

provide, to the client device in response to the request and within the messaging thread, a first set of characteristics of a first characteristic category type associated with the media production and a second set of characteristics of a second characteristic category type associated with the media production for determining the customized subset of video clips;

determine, in response to receiving a first characteristic selection from the first set of characteristics from the client device via the messaging thread in connection with the request, a first characteristic for customizing the video trailer for display on the client device, the first characteristic corresponding to the first characteristic category type associated with the media production;

determine, in response to receiving a second characteristic selection from the second set of characteristics from the client device via the messaging thread in connection with the request, a second characteristic for customizing the video trailer for display on the client device, the second characteristic corresponding to the second characteristic category type associated with the media production;

select the customized subset of video clips from the plurality of video clips comprising separate scenes in the media production by selecting a first video clip of the plurality of video clips and a second video clip of the plurality of video clips, wherein the first video clip comprises content emphasizing the first characteristic and the second video clip comprising content emphasizing the second characteristic; and provide, to the client device via the messaging thread in connection with the request, a customized video trailer for the media production that combines the first video clip and the second video clip comprising content emphasizing the first characteristic and the second characteristic into a single video trailer.

20. The system as recited in claim 19, further comprising instructions that, when executed by the at least one processor, cause the system to generate the customized video trailer for the media production in response to determining the first characteristic and the second characteristic by:

identifying, based on the first characteristic and the second characteristic, the first video clip, the second video clip, and at least one audio track; and processing the first video clip, the second video clip, and the at least one audio track to generate the customized video trailer.

* * * * *